United States Patent
Sawada et al.

(10) Patent No.: US 10,832,128 B2
(45) Date of Patent: Nov. 10, 2020

(54) TRANSFER LEARNING APPARATUS, TRANSFER LEARNING SYSTEM, TRANSFER LEARNING METHOD, AND RECORDING MEDIUM

(71) Applicant: Panasonic Intellectual Property Management Co., Ltd., Osaka (JP)

(72) Inventors: Yoshihide Sawada, Kyoto (JP); Kazuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1232 days.

(21) Appl. No.: 14/997,539

(22) Filed: Jan. 17, 2016

(65) Prior Publication Data

US 2016/0224892 A1    Aug. 4, 2016

(30) Foreign Application Priority Data

Jan. 29, 2015  (JP) .................................. 2015-016125

(51) Int. Cl.
    *G06N 3/08*    (2006.01)

(52) U.S. Cl.
    CPC ..................... *G06N 3/08* (2013.01)

(58) Field of Classification Search
    CPC ........................................................ F06N 3/08
    See application file for complete search history.

(56) References Cited

U.S. PATENT DOCUMENTS

| 2003/0194124 | A1* | 10/2003 | Suzuki | G06T 7/0012 |
| | | | | 382/156 |
| 2009/0141969 | A1* | 6/2009 | Yu | G06K 9/6256 |
| | | | | 382/157 |
| 2014/0317035 | A1* | 10/2014 | Szatmary | G06N 3/049 |
| | | | | 706/27 |

OTHER PUBLICATIONS

Kikawa et al., "Frequency-Based Multiplayer Neural Network with On-Chip Learning and Enhanced Neuron Characteristics", IEEE Transactions on Neural Networks, vol. 10, No. 3, May 1999 (Year: 1999).*

Yang, et al., "A Survey on Transfer Learning", IEEE Transactions on Knowledge and Data Engineering, vol. 22, No. 10, Oct. 2010 (Year: 2010).*

(Continued)

*Primary Examiner* — Eric Nilsson
*Assistant Examiner* — Tsu-Chang Lee
(74) *Attorney, Agent, or Firm* — Wenderoth, Lind & Ponack, L.L.P.

(57) ABSTRACT

A transfer learning apparatus includes a transfer target data evaluator and an output layer adjuster. The transfer target data evaluator inputs a plurality of labeled transfer target data items each assigned a label of a corresponding evaluation item from among one or more evaluation items to a neural network apparatus having been trained by using a plurality of labeled transfer source data items and including in an output layer output units, the number of which is larger than or equal to the number of evaluation items, and obtains evaluation values output from the respective output units. The output layer adjuster preferentially assigns, to each of the one or more evaluation items, an output unit from which the evaluation value having the smallest difference from the label of the evaluation item is obtained with a higher frequency, as an output unit that outputs the evaluation value of the evaluation item.

2 Claims, 26 Drawing Sheets

(56) References Cited

OTHER PUBLICATIONS

Over Oquab, et al., "Learning and Transferring Mid-Level Image Representations using Convolutional Neural Networks", CVPR 2014 [hereafter Oquab] (Year: 2014).*
Maxime Oquab et al.,"Learning and Transferring Mid-Level Image Representations using Convolutional Neural Networks", CVPR, Jun. 2014 <hal-00911179v1>.

* cited by examiner

FIG. 21

| | | |
|---|---|---|
| 1. Do you sometimes stumble? | Yes | No |
| 2. Can you go up and down the stairs without using the handrail? | Yes | No |
| 3. Has your walking pace become slower than before? | Yes | No |
| 4. Are you worried about your forgetfulness? | Yes | No |
| 5. Can you stand on one leg for 5 seconds? | Yes | No |
| 6. Do you sometimes have vertigo or feel shaky? | Yes | No |
| 7. Can you firmly wring out the towel? | Yes | No |
| 8. Do you have knee pain? | Yes | No |
| 9. Do you use a walking stick? | Yes | No |
| 10. Do you more often have trouble seeing than before? | Yes | No | ns
TRANSFER LEARNING APPARATUS, TRANSFER LEARNING SYSTEM, TRANSFER LEARNING METHOD, AND RECORDING MEDIUM

BACKGROUND

1. Technical Field

The present disclosure relates to a transfer learning apparatus, a transfer learning system, a transfer learning method, and a recording medium. In particular, the present disclosure relates to transfer learning in a neural network apparatus.

2. Description of the Related Art

In recent years, studies have been conducted on transfer learning in neural networks. Transfer learning in neural networks is an adaptation for using a result obtained by learning transfer source data items, in feature extraction such as classification or regression of transfer target data items.

For example, in Maxime Oquab, Leon Bottou, Ivan Laptev, Josef Sivic "Learning and Transferring Mid-Level Image Representations using Convolutional Neural Networks", CVPR, June 2014 <hal-00911179v1> (hereinafter, referred to as Non-patent Literature), a transfer learning method has been proposed in which a multi-layer neural network that has been trained through deep learning by using transfer source data items is further trained to be adaptive to transfer target data items. Specifically, the following method has been proposed in Non-patent Literature.

A first multi-layer neural network, which is a multi-layer neural network trained by using a plurality of first data items, is prepared. In transfer learning, the configuration of some of the layers of the first multi-layer neural network is changed to obtain a new multi-layer neural network. The new multi-layer neural network is trained by using a plurality of second data items to obtain a second multi-layer neural network. The plurality of first data items serve as transfer source data items, whereas the plurality of second data items serve as transfer target data items.

In transfer learning disclosed by Non-patent Literature, lower layers from the input layer to a certain hidden layer of the multi-layer neural network that has been trained through deep learning are used as a general-purpose feature extractor without modifying the configuration thereof. In contrast, upper layers from a hidden layer that accepts an output of the certain hidden layer to the output layer of the multi-layer neural network are replaced with newly configured adaptive layers (that is, new hidden and output layers), and the adaptive layers are trained by using the transfer target data items.

Transfer learning disclosed by Non-patent Literature is performed in the following manner. First, the first multi-layer neural network that includes a plurality of layers C1 to C5 and FC6 to FC8 and that has been trained by using the plurality of first data items, which serve as transfer source data items (a large number of available labeled images), is prepared. Then, the layer FC8 is removed from the first multi-layer neural network, and two adaptive layers FCa and FCb are added to obtain a new multi-layer neural network. The new multi-layer neural network is then trained by using the plurality of second data items, which serve as transfer target data items, to obtain the second multi-layer neural network.

Non-patent Literature reports an experiment as follows. The multi-layer neural network that is emulated by software that runs on an image processor is trained through deep learning by using approximately 1.2 million transfer source images serving as transfer source data items. Then, the above-described transfer learning is performed by using transfer target images that serve as transfer target data items and are different types of images. The report indicates that the recognition accuracy of an object and an action depicted in the transfer target images improves as a result of transfer learning even if the transfer target images are types of images different from those of the transfer source images.

However, the inventors have noticed some issues that might decrease the learning effects of transfer learning disclosed by Non-patent Literature.

SUMMARY

One non-limiting and exemplary embodiment provides a novel transfer learning apparatus suitable for transfer learning in a neural network apparatus.

In one general aspect, the techniques disclosed here feature a transfer learning apparatus including a transfer target data evaluator that inputs a plurality of labeled transfer target data items to a neural network apparatus, each of the plurality of labeled transfer target data items being assigned a label of a corresponding evaluation item from among one or more evaluation items, the neural network apparatus having been trained by using a plurality of labeled transfer source data items and including in an output layer one or more output units, the number of which is larger than or equal to the number of evaluation items, and that obtains evaluation values output from the respective output units; and an output layer adjuster that preferentially assigns, to each of the one or more evaluation items, an output unit from which the evaluation value having the smallest difference from the label of the evaluation item is obtained with a higher frequency among the output units, as an output unit that outputs the evaluation value of the evaluation item.

According to the aspect of the present disclosure, transfer leaning for adaptation to transfer target data items is implemented by assigning, to each of evaluation items of transfer target data items, an output unit that outputs an evaluation value of the evaluation item, while using a configuration and weight values of the neural network apparatus that have been set through learning performed using transfer source data items.

Note that the transfer source data items correspond to the plurality of first data items described in the "BACKGROUND" section and may include a plurality of pixel values included in each of a plurality of images used when the weight values of the neural network apparatus are determined.

In addition, the transfer target data items may include a plurality of pixel values included in each of a plurality of images used for transfer learning of the neural network apparatus configured using the transfer source data items.

Note that the transfer source data items (transfer source images) and the transfer target data items (transfer target images) are data items (images) of different types. The transfer target images are, for example, medical images, such as images of (part of) organs. The transfer source images are, for example, non-medical images, such as images of general objects (e.g., animals, vehicles, and plants). The number of transfer source images is far larger than the number of transfer target images. For example, as for an example of generally available datasets, the number of medical image data items (transfer target images) amounts to several tens to several hundreds of data items, whereas the number of general image data items (transfer source images) exceeds 14 million data items, which is more than ten thousand times the number of medical image data items.

Accordingly, a transfer learning apparatus is obtained which saves the time and effort for changing the configuration and weight values of the neural network apparatus by using the transfer target data items during transfer learning and which is free from unwanted effects, such as overfitting and a decrease in the recognition accuracy that may occur as a result of changing the configuration and the weight values.

It should be noted that general or specific embodiments may be implemented as a system, a method, an integrated circuit, a computer program, a computer-readable recording medium, or any selective combination thereof. Examples of the computer-readable recording medium include a nonvolatile recording medium, for example, a Compact Disc-Read Only Memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 21 is a diagram illustrating an example of workflow data;

DETAILED DESCRIPTION

Figure 1:
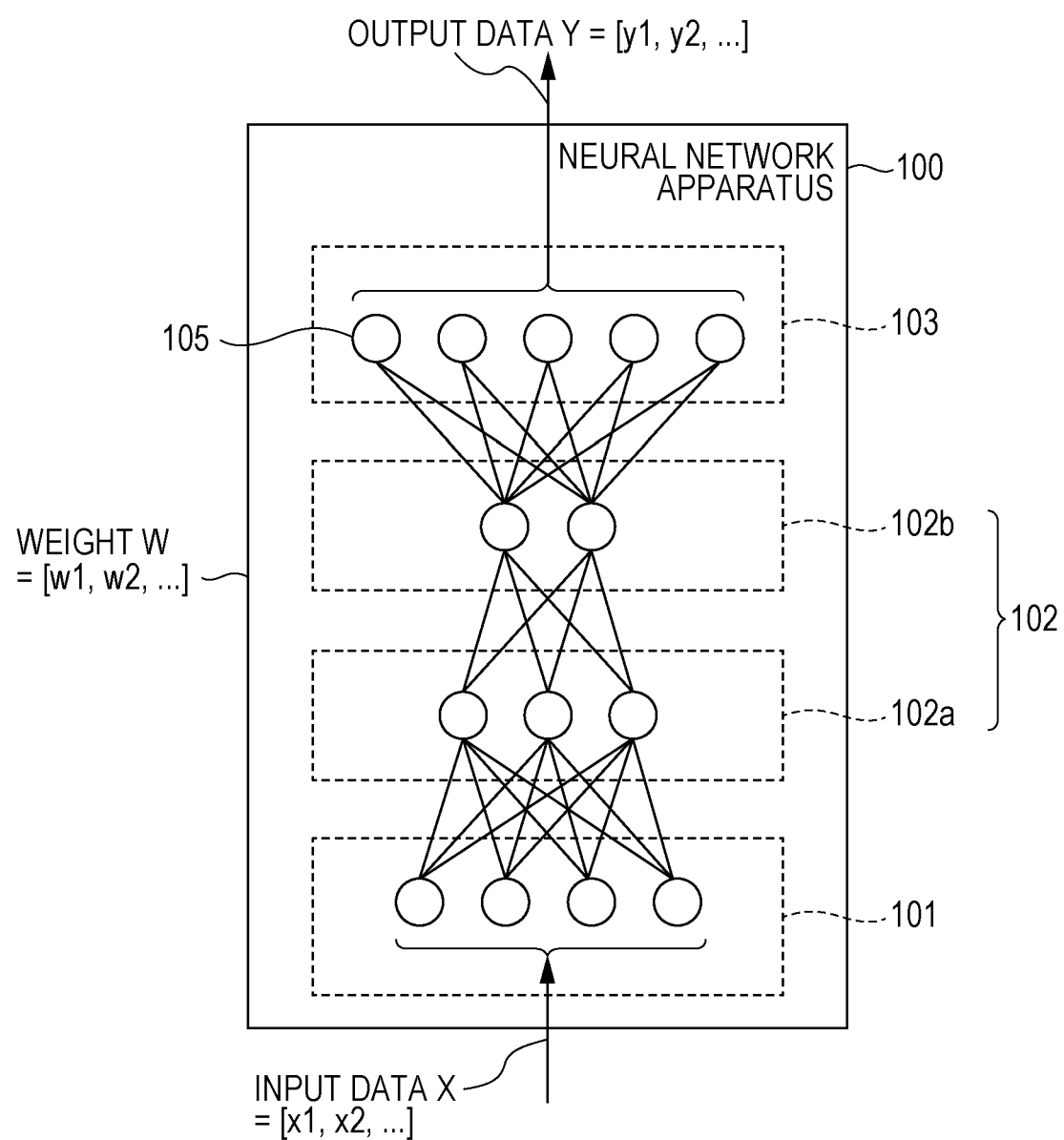
FIG. 1 is a conceptual diagram that describes a computation model of a computation performed by a neural network apparatus.

Underlying Knowledge Forming Basis of Present Disclosure

The inventors have noticed some issues that might decrease the learning effects of transfer learning disclosed by Non-patent Literature described in the "BACKGROUND" section.

As described in the "BACKGROUND" section, lower layers of a multi-layer neural network that has been trained through deep learning are used without modifying the configuration thereof, whereas upper layers are newly configured and are trained to be adaptive to transfer target data items. However, there is no usable criterion for clearly defining a suitable range of the lower layers, and newly configuring the upper layers requires the time and effort. In addition, in the case where transfer target data items are data items of a relatively small scale, overfitting may occur as a result of training the new upper layers by using the small-scale data items from the initial state. Further, since the lower layers and the upper layers are trained by using different types of data items, unwanted effects such as a decrease in the recognition accuracy may occur depending on the combination of data items.

The inventors have enthusiastically conducted studies to deal with such issues and have conceived a transfer learning apparatus, a transfer learning system, and a transfer learning method disclosed below.

A transfer learning apparatus according to one disclosed aspect includes a transfer target data evaluator that inputs a plurality of labeled transfer target data items to a neural network apparatus, each of the plurality of labeled transfer target data items being assigned a label of a corresponding evaluation item from among one or more evaluation items, the neural network apparatus having been trained by using a plurality of labeled transfer source data items and including in an output layer one or more output units, the number of which is larger than or equal to the number of evaluation items, and that obtains evaluation values output from the respective output units; and an output layer adjuster that preferentially assigns, to each of the one or more evaluation items, an output unit from which the evaluation value having the smallest difference from the label of the evaluation item is obtained with a higher frequency among the output units, as an output unit that outputs the evaluation value of the evaluation item.

With such a configuration, transfer leaning for adaptation to transfer target data items is performed, as a result of assignment of output units that output evaluation values of corresponding evaluation items of the transfer target data items, by using a configuration and weight values of the neural network apparatus that are set through learning performed using transfer source data items.

Accordingly, a transfer learning apparatus is obtained which saves the time and effort for changing the configuration and weight values of the neural network by using the transfer target data items during transfer learning and which is free from unwanted effects, such as overfitting and a decrease in the recognition accuracy that may occur as a result of changing the configuration and the weight values.

In addition, the output layer adjuster may compute, for each of the one or more evaluation items, a frequency distribution of the output units from which the evaluation value having the smallest difference from the label of the evaluation item is obtained for the plurality of labeled transfer target data items, preferentially select, from among combinations for associating each of the one or more evaluation items with a different one of the output units, a combination for which a sum of the frequencies of the associated output units is larger, and assign, to each of the one or more evaluation items, the output unit associated with the evaluation item by the selected combination as an output unit for the evaluation item.

With such a configuration, output units that output evaluation values of corresponding evaluation items of the transfer target data items may be appropriately assigned.

In addition, the transfer learning apparatus may further include a weight adjuster that updates, by using a weight value that has been learned with the plurality of labeled transfer source data items as an initial value, the weight value in the neural network apparatus through supervised learning using the plurality of labeled transfer target data items.

With such a configuration, the weight value used in the neural network are updated through learning based on the transfer target data items, by using the learned weight value as the initial value. Accordingly, overfitting that may occur when learning is performed based on a small number of transfer target data items without using the learned weight value may be suppressed.

In addition, the weight adjuster may set weight values of all units included in the neural network apparatus as targets to be updated.

With such a configuration, a decrease in the recognition accuracy, which may occur in the case only the weight values used in the neural network apparatus are updated only for some units, such as the case where only weight values of units located in upper layers of a multi-layer neural network are updated, may be suppressed.

In addition, each of the plurality of labeled transfer source data items may be assigned a label corresponding to one of the output units, and the weight adjuster may further update the weight value in the neural network apparatus through supervised learning using labels corresponding to the output units assigned by the output layer adjuster from among the labels assigned to the plurality of labeled transfer source data items.

With such a configuration, the weight values obtained by learning based on the plurality of labeled transfer source data items can be updated through relearning that is performed by using only the labels of the transfer source data items that are highly related to the evaluation items of the transfer target data items. In this way, a decrease in the recognition accuracy, which may occur as a result of the labels of the transfer source data items that are not highly related to the evaluation items of the transfer target data items serving as noise, may be suppressed.

In addition, the weight adjuster may perform unsupervised learning in each of one or more hidden layers included in the neural network apparatus prior to the supervised learning.

With such a configuration, it may be expected that the recognition accuracy is improved by performing unsupervised learning on a layer-by-layer basis in advance.

In addition, the neural network apparatus may include in the output layer the output units, the number of which is larger than the number of evaluation items, and the transfer learning apparatus may further include a learning deficiency detector that inputs one or more unlabeled transfer target data items to the neural network apparatus, obtains an evaluation value output from an output unit that is not assigned by the output layer adjuster among the output units, and detects deficiency in learning if the evaluation value deviates from a reference range.

As the reference range, a range of values that contradict with the output values of the output units that have not been assigned by the output layer adjuster may be used. Before detection of deficiency in learning, for example, the neural network apparatus may be trained so that the output values of the output units that have not been assigned by the output layer adjuster are equal to a specific value, such as 0. In this case, deficiency in learning is detected when the evaluation value deviates from the reference range including the specific value.

With such a configuration, deficiency in transfer learning for being adaptive to the unlabeled transfer target data items in the neural network apparatus is detectable. Accordingly, it is indicated that further measures for adaptation, such as additional learning, is needed.

In addition, the transfer learning apparatus may further include a correct solution obtainer that accepts, in a case where deficiency in learning is detected for the unlabeled transfer target data item, a label corresponding to the unlabeled transfer target data item from a user, and the weight adjuster may update the weight value in the neural network apparatus through supervised learning using the label accepted from the user and the unlabeled transfer target data item.

With such a configuration, by accepting, from the user, a label for the unlabeled transfer target data item for which deficiency in transfer learning is detected, additional learning may be performed by using the label and the unlabeled transfer target data item.

In addition, the correct solution obtainer may accept, from the user, a label that is common to a plurality of unlabeled transfer target data items for which evaluation values output from a single output unit that is not assigned by the output layer adjuster deviate from the reference range, and the weight adjuster may update the weight value in the neural network apparatus through supervised learning using the label accepted from the user and the plurality of unlabeled transfer target data items.

With such a configuration, additional learning may be performed by using a label accepted from the user and the plurality of unlabeled transfer target data items.

In addition, each of the plurality of labeled transfer target data items may be further assigned an associative data item, the correct solution obtainer may accept, from the user, an associative data item for the unlabeled transfer target data item, and the weight adjuster may perform the supervised learning by using a label of a labeled transfer target data item that is assigned the associative data item accepted from the user and the unlabeled transfer target data item.

With such a configuration, the user is permitted to specify a label of the unlabeled transfer destination data item on the basis of the associative data item when it is difficult for the user to directly specify the label for the unlabeled transfer target data item. In this way, additional learning may be performed by using the label and the unlabeled transfer target data item.

A transfer learning method according to one disclosed aspect includes performing a first process by using a neural network including a plurality of units; performing a second process by using the neural network; and performing a third process; wherein a plurality of weight values for the plurality of units are determined by using a plurality of first datasets prior to the first process and the second process, wherein the plurality of units include a plurality of output layer units included in an output layer of the neural network, and each of the plurality of first datasets includes a plurality of pixel values of an image not related to a first subject matter, wherein the first process includes a fourth process and a fifth process, wherein the fourth process includes performing a sixth process n times while incrementing k from 1 to n, where n denotes a total number of a plurality of second datasets and k is a natural number, the sixth process including inputting a k-th dataset of the plurality of second datasets to the neural network and obtaining k-th information indicating an output layer unit that outputs a first valid value from among the plurality of output layer units, wherein the fifth process includes determining, for each of the plurality of output layer units, a probability of outputting the first valid value on the basis of a result of the fourth process, wherein the second process includes a seventh process and an eighth process, wherein the seventh process includes performing a ninth process m times while incrementing j from 1 to m, where m denotes a total number of a plurality of third datasets and j denotes a natural number, the ninth process including inputting a j-th dataset of the plurality of third datasets to the neural network and obtaining j-th information indicating an output layer unit that outputs a second valid value from among the plurality of output layer units, wherein the eighth process includes determining, for each of the plurality of output layer units, a probability of outputting the second valid value on the basis of a result of the seventh process, wherein each of the plurality of second datasets and the plurality of third datasets includes a plurality of pixel values of an image related to the first subject matter, each of the plurality of second datasets has attribute information indicating a first data type, each of the plurality of third datasets has attribute information indicating a second data type different from the first data type, and the number of first datasets is larger than (n+m), and wherein the third process is a process of selecting two output layer units from among the plurality of output layer units on the basis of a result of the first process and a result of the second process. The image not related to the first subject matter may be a non-organ image and the image related to the first subject matter may be an organ image, and the attribute information indicating the first data type may be the attribute information indicating a lesion and the attribute information indicating the second data type may be the attribute information indicating a non-lesion.

It should be noted that these general or specific embodiments may be implemented as an apparatus, a system, a method, an integrated circuit, a computer program, a computer-readable recording medium, or any selective combination thereof.

Embodiments of the present disclosure will be described in detail below with reference to the accompanying drawings.

Note that each of the embodiments below describes a general or specific example. Numerical values, shapes, materials, elements, arranged positions and connection forms of the elements, steps, the order of the steps, and the like described in the following exemplary embodiments are merely examples, and do not limit the present disclosure. Also, among elements described in the following exemplary embodiments, elements that are not included in an independent claim which represents the highest concept are described as optional elements.

Neural Network Apparatus

A general configuration of a neural network apparatus will be described before embodiments are described.

FIG. 1 is a conceptual diagram that describes a computation model of a computation performed by a neural network apparatus. As is known, a neural network apparatus is a computation apparatus that performs a computation in accordance with a computation model that mimics the neural network of living organisms.

As illustrated in FIG. 1, a neural network apparatus 100 includes an input layer 101, hidden layers 102, and an output layer 103. Each of the input layer 101, the hidden layers 102, and the output layer 103 includes a plurality of units 105 (represented by empty circles), each of which corresponds to a neuron. The hidden layers 102 include, for example, two hidden layers 102a and 102b; however, the hidden layers 102 may include a single hidden layer or three or more hidden layers. In particular, a neural network apparatus including a plurality of hidden layers is also called a multi-layer neural network apparatus.

Suppose that layers close to the input layer 101 are called lower layers and that layers close to the output layer 103 are called upper layers. In such a case, each of the units 105 serves as a computation element that combines computation results received from units in a lower layer in accordance with a weight value (for example, performs a weighted sum computation) and then sends the result of combination to a unit in an upper layer.

Functions of the neural network apparatus 100 are defined by configuration information and a weight $W=[w1, w2, \ldots]$. The configuration information indicates the number of layers of the neural network apparatus 100 and the number of units 105 included in each of the layers. The weight W represents weight values used by the respective units 105 in a weighted sum computation.

In the neural network apparatus 100, a weighted sum computation is performed by the units 105 in the hidden layers 102 and the output layer 103 by using the weight W=[w1, w2, . . . ] in response to the units 105 in the input layer 101 being fed with element values of input data X= [x1, x2, . . . ], and element values of output data Y=[y1, y2, . . . ] are output from the units 105 in the output layer 103.

Suppose that the units 105 in the input layer 101 are respectively referred to as an input unit 1, an input unit 2, . . . , an input unit k, . . . , and an input unit n (where k≤n and k and n are natural numbers). In such a case, the input data X may be denoted as [x1, x2, . . . , xk, . . . , xn]. In addition, the element values x1, x2, . . . , xk, . . . , and xn may be respectively input to the input units 1, 2, . . . , k, . . . , and n.

Suppose that the units 105 in the output layer 103 are respectively referred to as an output unit 1, an output unit 2, . . . , an output unit p, . . . , and an output unit q (where p≤q and p and q are natural numbers). In such a case, the output data Y may be denoted as [y1, y2, . . . , yp, . . . , yq]. In addition, the element values y1, y2, . . . , yp, . . . , yq may be respectively output from the output units 1, 2, . . . , p, . . . , and q.

Hereinafter, the units 105 in the input layer 101, the units 105 in the hidden layers 102, and the units 105 in the output layer 103 are respectively referred to as input units, hidden units, and output units.

The embodiments of the present disclosure do not limit how the neural network apparatus 100 is specifically implemented. The neural network apparatus 100 may be implemented, for example, by reconfigurable hardware or by software-based emulation.

Transfer learning according to embodiments of the present disclosure is performed by using the neural network apparatus 100 that has been trained by using a plurality of labeled transfer source data items. That is, the configuration and weight values of the neural network apparatus 100 used in transfer learning are set in advance through learning performed by using the plurality of labeled transfer source data items.

It is assumed in the embodiments of the present disclosure that learning is performed by the neural network apparatus 100 in accordance with any method of the related art, and a specific method is not particularly specified. For example, learning may be performed by a learning apparatus (not illustrated) connected to the neural network apparatus 100 in accordance with a method of the related art described below.

Figure 2:
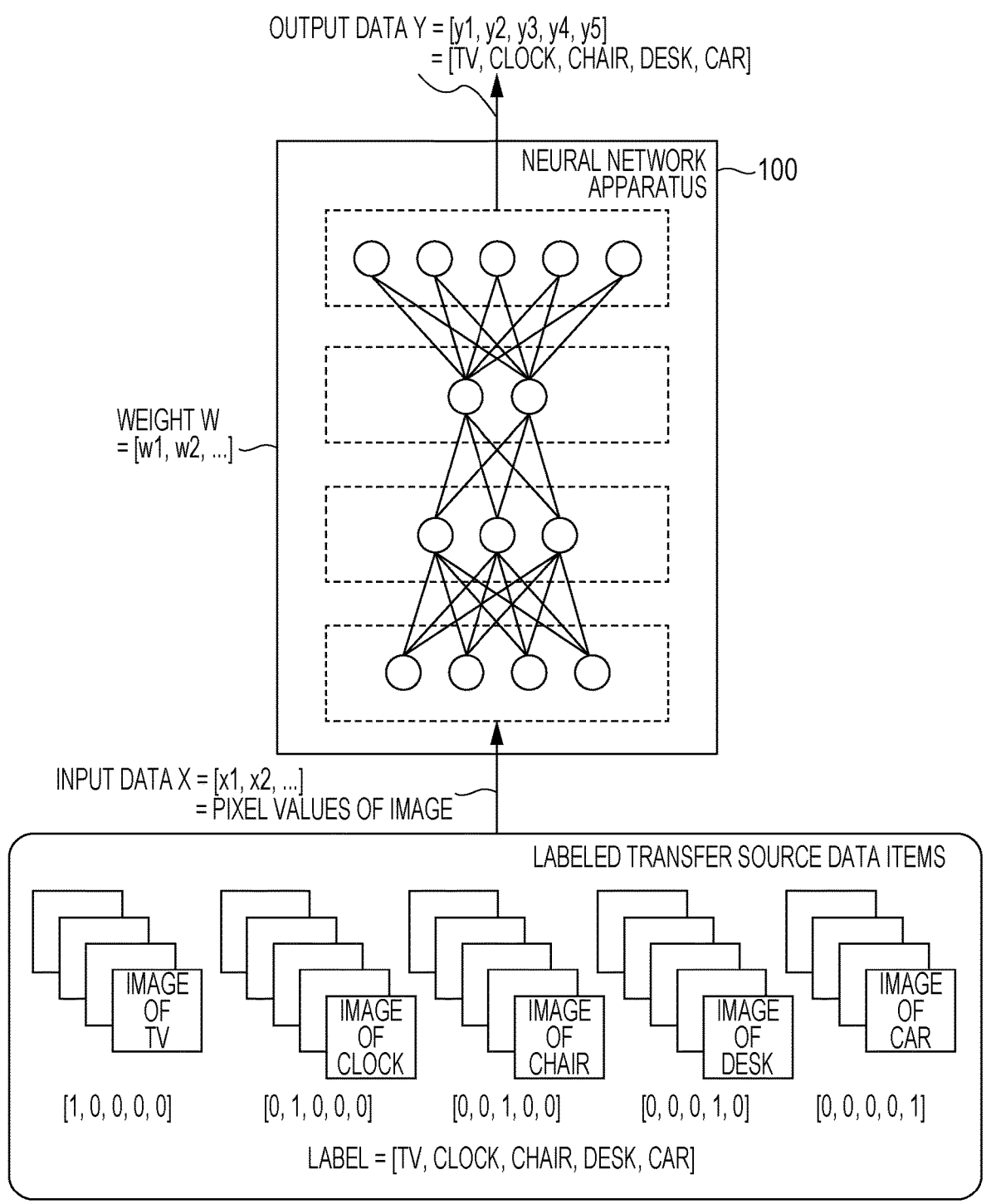
FIG. 2 is a diagram that describes an example of learning performed by the neural network apparatus to solve a classification problem.

FIG. 2 is a diagram that describes an example of learning performed by the neural network apparatus 100 to solve a classification problem.

In the example illustrated in FIG. 2, labeled transfer source data items include images of a television (TV), images of a clock, images of a chair, images of a desk, and images of a car. Each of the images is assigned a corresponding one of five labels for the categories "TV", "clock", "chair", "desk", and "car". Among the five labels, only the label for the correct category of the image has a value of 1, and the labels for the other categories have a value of 0.

In the neural network apparatus 100 for solving a classification problem, each of the output units is associated with a different one of the categories into which the input data X is to be classified. The weight W is adjusted to make, when each input data X is input, the output value of the output unit associated with the correct category of the input data X closer to 1 and the output values of the other output units closer to 0.

In the example illustrated in FIG. 2, the output units of the neural network apparatus 100 are each associated with a different one of the five categories "TV", "clock", "chair", "desk", and "car". In addition, the weight W is adjusted through supervised learning to make a difference between the output data Y that is output in response to input of [x1, x2, . . . ,] which represent pixel values of an image included in the labeled transfer source data items, and the label assigned to the image smaller.

During the supervised learning, for example, a loss function representing an error between the label and the output data Y may be defined by using the input data X, the weight W, and the label, and then the weight W may be updated in accordance with a gradient for decreasing the loss function based on gradient descent.

In particular, in the case where the neural network apparatus 100 is a multi-layer neural network apparatus, the weight values may be adjusted individually for each hidden layer through unsupervised learning called layer-wise pre-training before the supervised learning is performed. With such a configuration, the weight W that makes classification more accurate is obtained by the subsequent supervised learning.

During the unsupervised learning, for example, a loss function representing a certain evaluation value that is not dependent on the label may be defined by using the input data X and the weight W, and then the weight W may be updated in accordance with a gradient for decreasing the loss function based on gradient descent.

Figure 3:
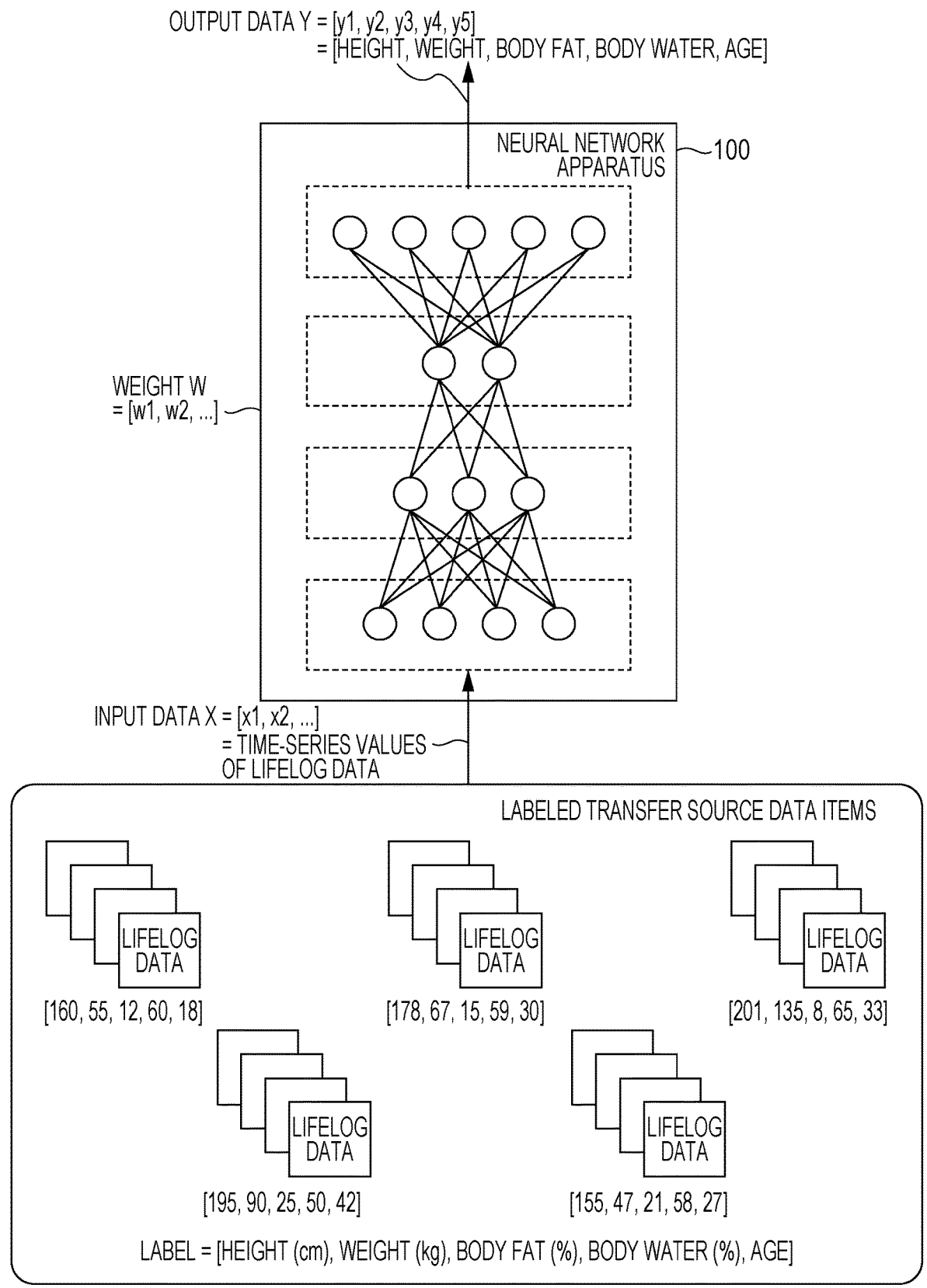
FIG. 3 is a diagram that describes an example of learning performed by the neural network apparatus to solve a regression problem.

FIG. 3 is a diagram that describes an example of learning performed by the neural network apparatus 100 to solve a regression problem.

In the example illustrated in FIG. 3, labeled transfer source data items include lifelog data items of a plurality of people. A lifelog data item may be time-series values of actions of a person measured by an accelerometer or an angular velocity sensor. Each lifelog data item is assigned five labels for attributes "height", "weight", "body fat", "body water", and "age" of the person. The five labels each indicate a correct value of the corresponding attribute of the person.

In the neural network apparatus 100 for solving a regression problem, the output units are each associated with a different one of the attributes for performing regression on the input data X. The weight W is adjusted to make, when each input data item X is input, each of the output values of the respective output units closer to the correct value of the corresponding attribute of the input data X.

In the example illustrated in FIG. 3, the output units of the neural network apparatus 100 are each associated with a different one of the five attributes "height", "weight", "body fat", "body water", and "age". In addition, the weight W is adjusted through supervised learning to make a difference between the output data Y that is output in response to input of a lifelog data item serving as a labeled transfer source data item and the label of the lifelog data item smaller.

Similarly to the classification problem, as a result of layer-wise unsupervised learning in the regression problem, the weight W that makes regression more accurate is obtained by the subsequent supervised learning. In addition, gradient descent is usable for the supervised learning and the unsupervised learning, which is similar to the case of the classification problem.

As described above, the operation and the learning method of the neural network apparatus 100 are basically common to the classification problem and the regression problem, except for the fact that definitions of the element values of the output data Y are different from each other. Accordingly, classification and regression are sometimes collectively referred to as evaluation herein without particularly distinguishing them from each other. The categories used in classification and the attributes used in regression are sometimes collectively referred to as evaluation items herein. The output values of the output units are sometimes referred to as evaluation values herein.

For example, any available algorithm such as backpropagation is usable to adjust the weight values used in the neural network apparatus 100, in addition to gradient descent described above. In addition, the configuration of the neural network apparatus 100 (for example, addition or deletion of a unit) alone may be changed without adjusting the weight values during learning in the neural network apparatus 100 or both the weight value adjustment and the configuration change may be performed. In particular, in a multi-layer neural network apparatus, learning may be performed individually on a layer-by-layer basis.

Transfer learning in the neural network apparatus 100 that has been trained by using labeled transfer source data items will be described below in accordance with a plurality of embodiments.

First Embodiment

A transfer learning apparatus according to a first embodiment is a transfer learning apparatus that performs transfer learning to be adaptive to transfer target data items, by assigning each of evaluation items of the transfer target data items an output unit that outputs an evaluation value of the evaluation item, while using the configuration and weight values of the neural network apparatus that has been trained by using a plurality of transfer source data items without changing the configuration and weight values thereof.

Figure 4:
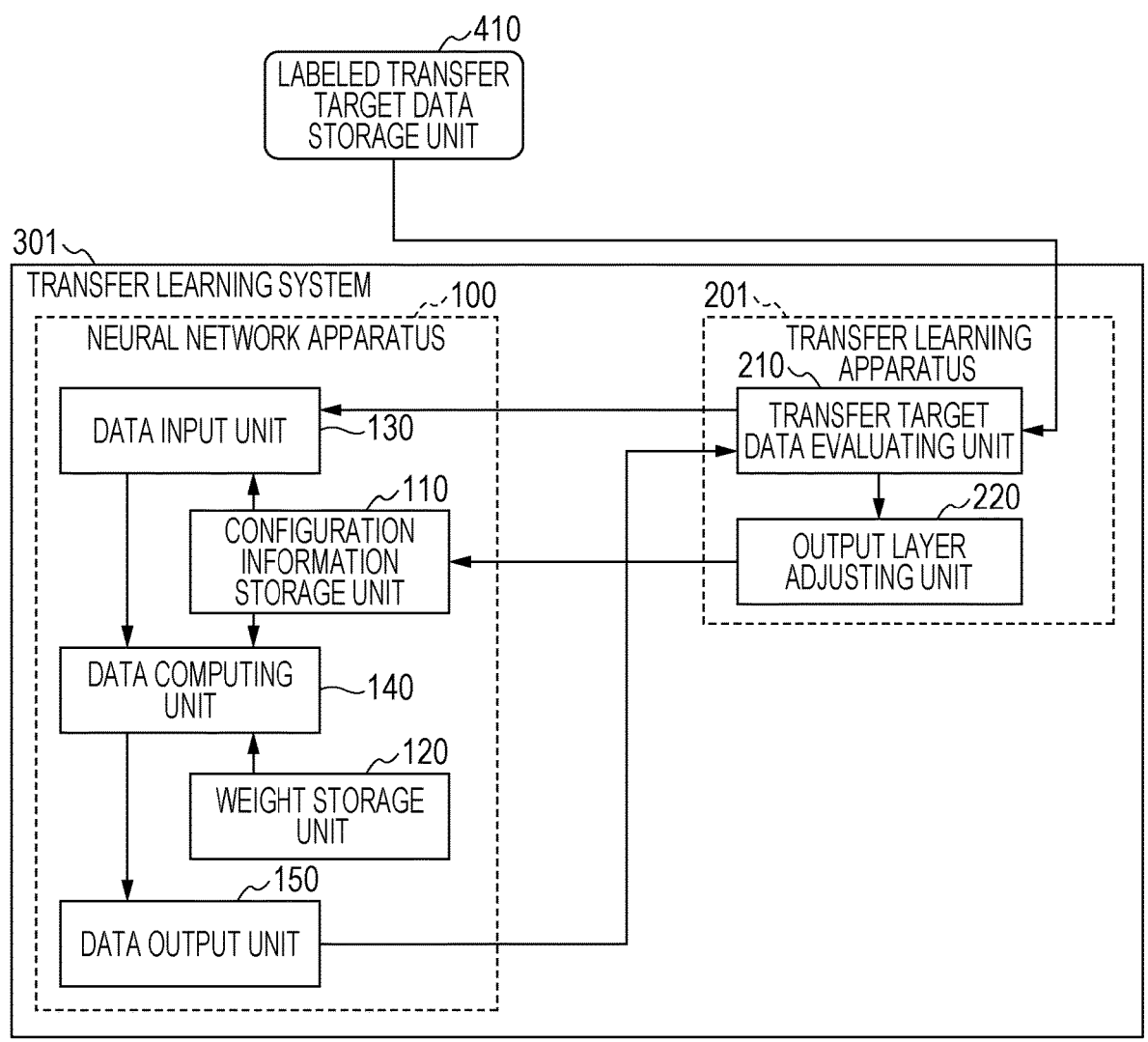
FIG. 4 is a block diagram illustrating an example of a functional configuration of a transfer learning apparatus according to a first embodiment.

FIG. 4 is a block diagram illustrating an example of a functional configuration of a transfer learning apparatus 201 according to the first embodiment. FIG. 4 illustrates, along with the transfer learning apparatus 201, a transfer learning system 301 and a labeled transfer target data storage unit 410. The transfer learning system 301 is implemented by using the transfer learning apparatus 201. The labeled transfer target data storage unit 410 stores a plurality of labeled transfer target data items therein, and the transfer learning apparatus 201 obtains the plurality of labeled transfer target data items therefrom.

As illustrated in FIG. 4, the transfer learning system 301 includes the neural network apparatus 100 described above and the transfer learning apparatus 201. Individual constituents of the transfer learning system 301 may be implemented as software functions that are carried out as a result of an image processor or microprocessor executing a certain program, for example.

The neural network apparatus 100 includes a configuration information storage unit 110, a weight storage unit 120, a data input unit 130, a data computing unit 140, and a data output unit 150.

The configuration information storage unit 110 stores configuration information. The configuration information indicates the number of layers included in the neural network apparatus 100 and the number of units 105 included in each of the layers.

The weight storage unit 120 stores the weight W. The weight W indicates weight values used by the respective units 105 for a weighted addition computation.

The data input unit 130 receives the input data X to be evaluated, for example, from a database (not illustrated) located outside the transfer learning system 301.

The data computing unit 140 performs a weighted addition computation by using the weight values indicated by the weight W in accordance with an arrangement of the units 105 indicated by the configuration information, thereby computing weighted sums at the individual units 105 in response to input of the input data X to the input units.

The data output unit 150 transmits the output data Y which includes the evaluation values that have been computed by the data computing unit 140 as the weighted sums at the individual output units 105.

It is assumed that the configuration information and the weight W of the neural network apparatus 100 are set in advance through learning performed using a plurality of labeled transfer source data items (not illustrated in FIG. 4) and are respectively stored in the configuration information storage unit 110 and the weight storage unit 120, prior to transfer learning. It is also assumed that the neural network apparatus 100 includes output units 105, the number of which is larger than or equal to the number of evaluation items of transfer target data items, in accordance with the configuration information.

The transfer learning apparatus 201 includes a transfer target data evaluating unit 210 and an output layer adjusting unit 220.

The transfer target data evaluating unit 210 obtains a plurality of transfer target data items from the labeled transfer target data storage unit 410, inputs the plurality of transfer target data items to the neural network apparatus 100, and obtains evaluation values output from the respective output units 105 of the neural network apparatus 100. Each of the plurality of transfer target data items is assigned a label of an evaluation item from among one or more evaluation items that are different from evaluation items of the transfer source data items.

The output layer adjusting unit 220 preferentially assigns, to each of the one or more evaluation items of the transfer target data items, an output unit from which the evaluation value having the smallest difference from the label of the evaluation item is obtained with a higher frequency among the output units, as an output unit that outputs the evaluation value of the evaluation item. The assignment result may be stored in the configuration information storage unit 110 as information indicating correspondences between the evaluation item and the output unit.

An example of an operation performed by the transfer learning apparatus 201 thus configured will be described next.

Figure 5:
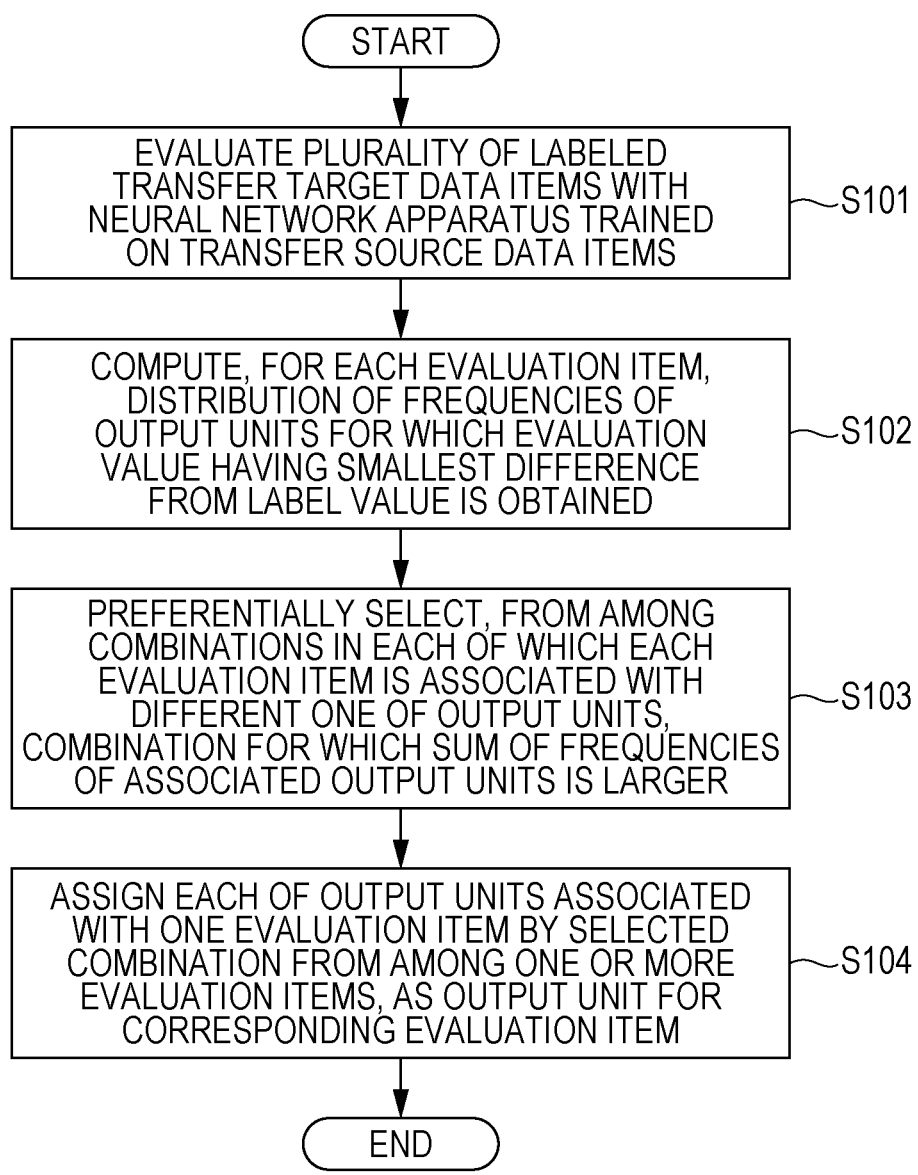
FIG. 5 is a flowchart illustrating an example of transfer learning according to the first embodiment.

FIG. 5 is a flowchart illustrating an example of transfer learning performed by the transfer learning apparatus 201.

In the transfer learning apparatus 201, the transfer target data evaluating unit 210 evaluates a plurality of transfer target data items by using the neural network apparatus 100 that has been trained by using transfer source data items (S101).

Figure 6:
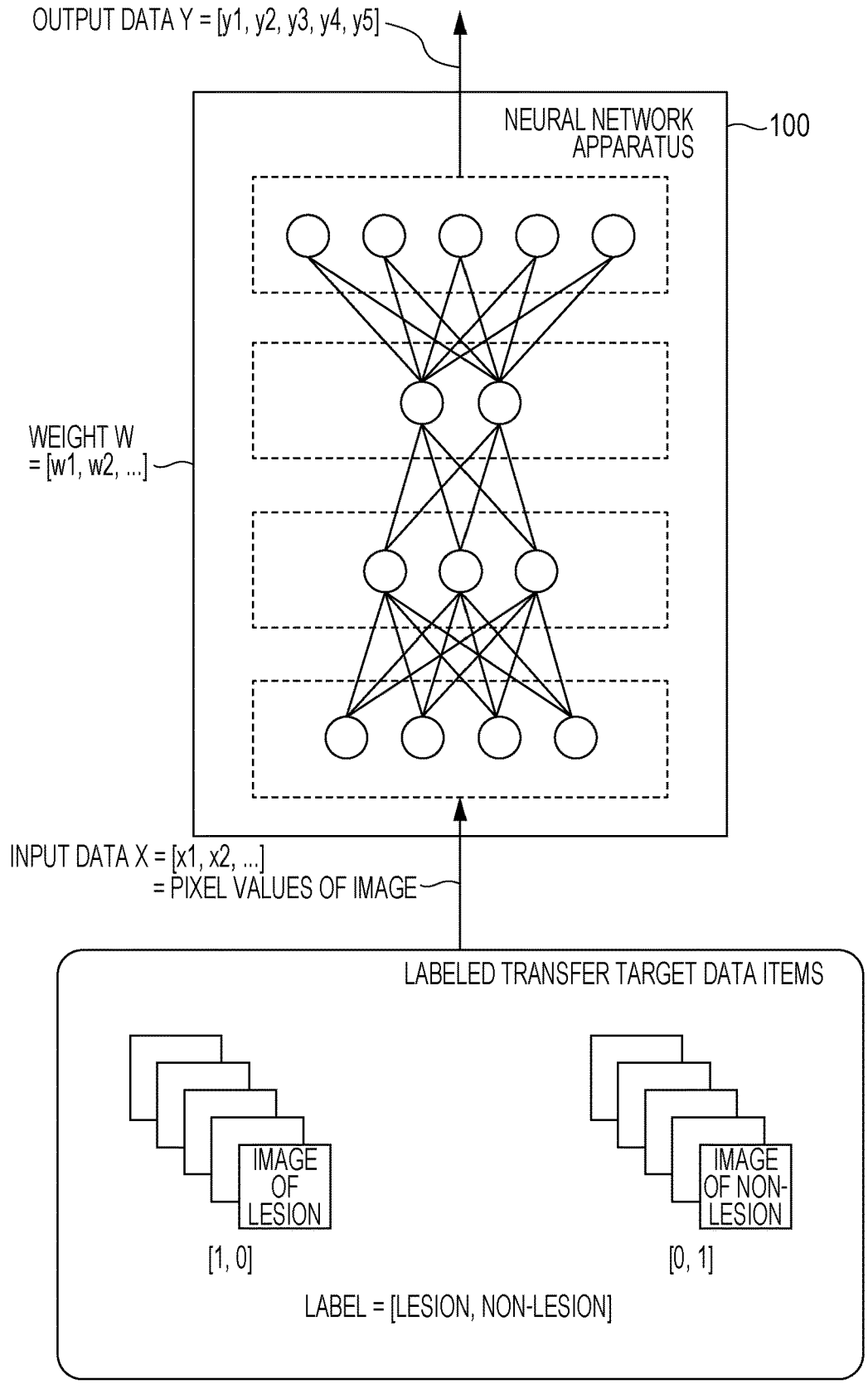
FIG. 6 is a diagram illustrating an example of labeled transfer target data items used in a classification problem.

FIG. 6 is a diagram illustrating an example of labeled transfer target data items used in a classification problem.

In the example illustrated in FIG. 6, the labeled transfer target data items include a plurality of lesion images and a plurality of non-lesion images. The lesion images and the non-lesion images are respectively assigned two labels for the categories "lesion" and "non-lesion". Among the two labels, the label for the category into which the image is to be classified has a value of 1, whereas the other label has a value of 0.

Every time a transfer target data item is input thereto, the neural network apparatus 100 outputs output data Y=[y1, y2, y3, y4, y5], which constituted by evaluation values output from the respective output units, in accordance with the configuration information and the weight W that are set in advance through learning performed using the transfer source data items.

The transfer target data evaluating unit 210 obtains the output data Y=[y1, y2, y3, y4, y5] for each of the plurality of transfer target data items.

The output layer adjusting unit 220 computes, for each evaluation items, a frequency of appearance of the closest evaluation value, which indicate frequencies of the output units for which an evaluation value having the smallest difference from the label value of the evaluation item is obtained (S102).

Figure 7A:
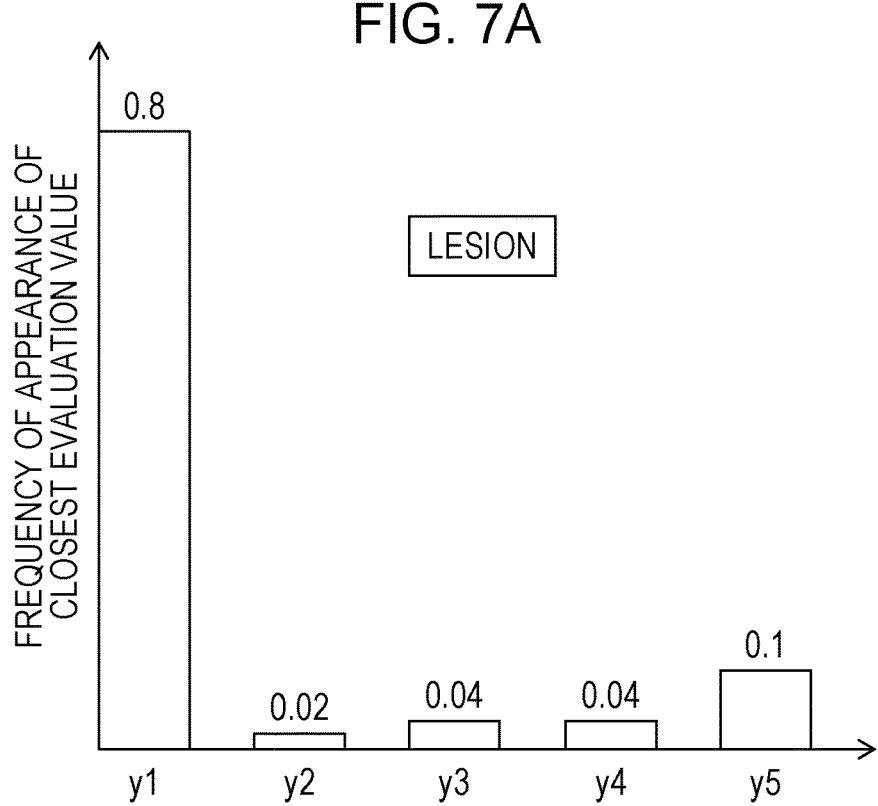
FIG. 7A is a diagram illustrating an example of a distribution of frequencies of appearance of the closest evaluation value for a category "lesion"

FIG. 7A is a diagram illustrating an example of a distribution of frequencies of appearance of the closest evaluation value for the category "lesion".

The example in FIG. 7A shows a ratio obtained when a plurality of lesion images are evaluated, the ratio being a ratio of the number of times each of the output values y1, y2, y3, y4, and y5 of the five output units is the closest to the value of the label "lesion", i.e., 1, to the number of lesion images that have been evaluated. For example, suppose that 1000 lesion images are evaluated and that the output values y1, y2, y3, y4, and y5 are the closest to 1 for 800 images, 20 images, 40 images, 40 images, and 100 images, respectively. In such a case, the distribution of frequencies of appearance of the closest evaluation value illustrated in FIG. 7A is derived.

Figure 7B:
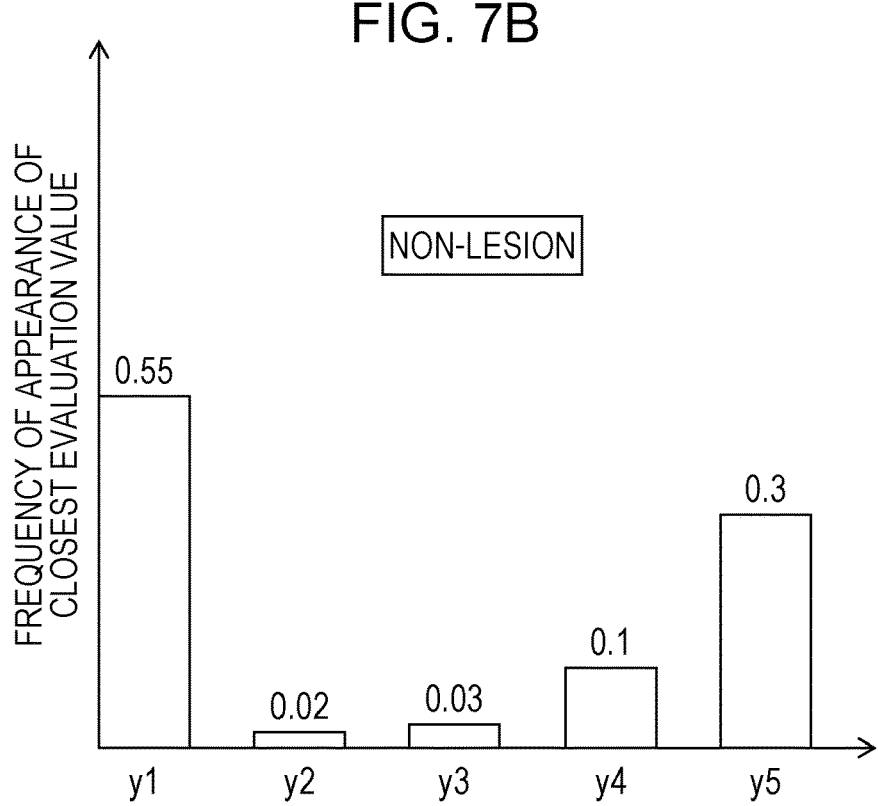
FIG. 7B is a diagram illustrating an example of a distribution of frequencies of appearance of the closest evaluation value for a category "non-lesion"

FIG. 7B is a diagram illustrating an example of a distribution of frequencies of appearance of the closest evaluation value for the category "non-lesion".

The example in FIG. 7B shows a ratio obtained when a plurality of non-lesion images are evaluated, the ratio being a ratio of the number of times each of the output values y1, y2, y3, y4, and y5 of the five output units is the closest to the value of the label "non-lesion", i.e., 1, to the number of non-lesion images that have been evaluated. For example, suppose that 1000 non-lesion images are evaluated and that the output values y1, y2, y3, y4, and y5 are the closest to 1 for 550 images, 20 images, 30 images, 100 images, and 300 images, respectively. In such a case, the distribution of frequencies of appearance of the closest evaluation value illustrated in FIG. 7B is derived.

The output layer adjusting unit 220 preferentially selects, from among combinations for associating each of the evaluation items with a different one of the output units, a combination for which a sum of the frequencies of appearances of the closest evaluation value for the associated output units is larger (S103).

As for the examples illustrated in FIGS. 7A and 7B, there are $_5P_2=20$ combinations for associating each of the categories "lesion" and "non-lesion" with a different one of the five output units. For example, if the output unit that outputs the output value y1 is associated with the category "lesion" and the output unit that outputs the output value y5 is associated with the category "non-lesion", the sum of the frequencies of appearance of the closest evaluation value for the associated output units is 0.8+0.3=1.1 This value is larger than the sum of the frequencies of appearance of the closest evaluation value for any other combination. Accordingly, the output layer adjusting unit 220 selects a combination in which the output unit that outputs the output value y1 is associated with the category "lesion" and the output unit that outputs the output value y5 is associated with the category "non-lesion".

The output layer adjusting unit 220 does not necessarily need to select a combination for which the sum of the frequencies of appearance of the closest evaluation value is the largest from among all the combinations. For example, there may be a very large number of combinations depending on the number of evaluation items and the number of output units. As a result, it may be substantially impossible to find a combination for which the sum of frequencies of appearance of the closest evaluation value is the largest. In such a case, the output layer adjusting unit 220 may preferentially select a combination for which the sum of the frequencies of appearance of the closest evaluation value is larger among a limited number of combinations. Alternatively, the output layer adjusting unit 220 may preferentially select a combination for which the sum of the frequencies of appearance of the closest evaluation values is the largest among a limited number of combinations.

The output layer adjusting unit 220 assigns, to each of the one or more evaluation items, the output unit associated with the evaluation item by the selected combination as the output unit of the evaluation item (S104). The assignment result may be stored, for example, in the configuration information storage unit 110 of the neural network apparatus 100 as information indicating correspondences between the evaluation item and the output unit.

Figure 8:
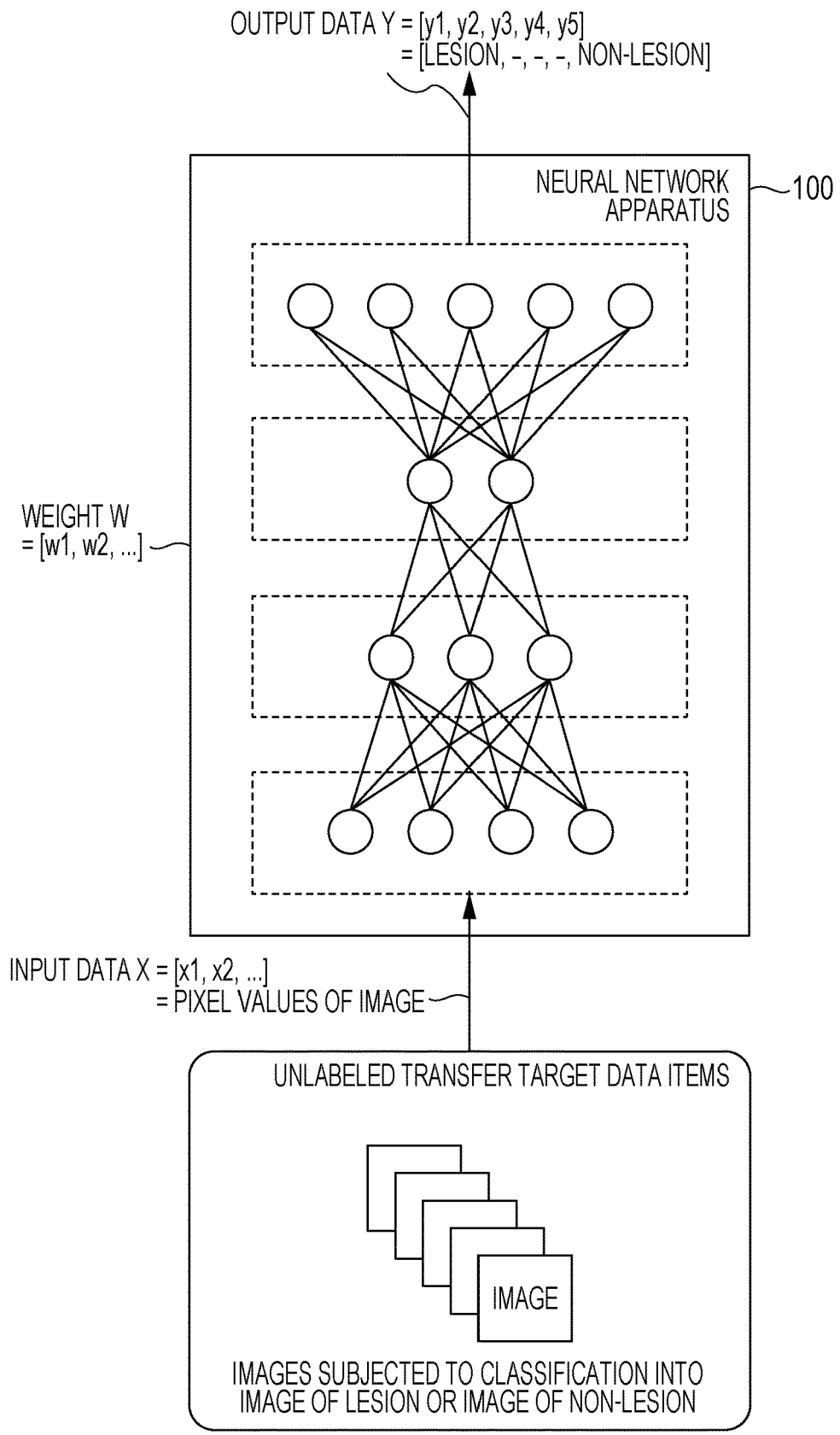
FIG. 8 is a diagram illustrating an example of assignment of output units to the categories "lesion" and "non-lesion"

FIG. 8 is a diagram illustrating an example of assignment of the output unit to the category "lesion" and assignment of the output unit to the category "non-lesion". In accordance with the selected combination, the output unit that outputs the output value y1 is assigned as the output unit for the category "lesion", and the output unit that outputs the output value y5 is assigned as the output unit for the category "non-lesion".

As a result of such assignment, the output value y1 that is obtained when a new image, which is an unlabeled transfer target data item, is input to the neural network apparatus 100 becomes usable as an evaluation value of the image for the category "lesion". The output value y5 that is obtained when a new image, which is an unlabeled transfer target data item, is input to the neural network apparatus 100 becomes usable as an evaluation value of the image for the category "non-lesion". In this way, transfer learning to be adaptive to the transfer target data items is performed.

A specific example regarding the classification problem has been described above. As for a regression problem, transfer learning is performed in a similar procedure.

Figure 9:
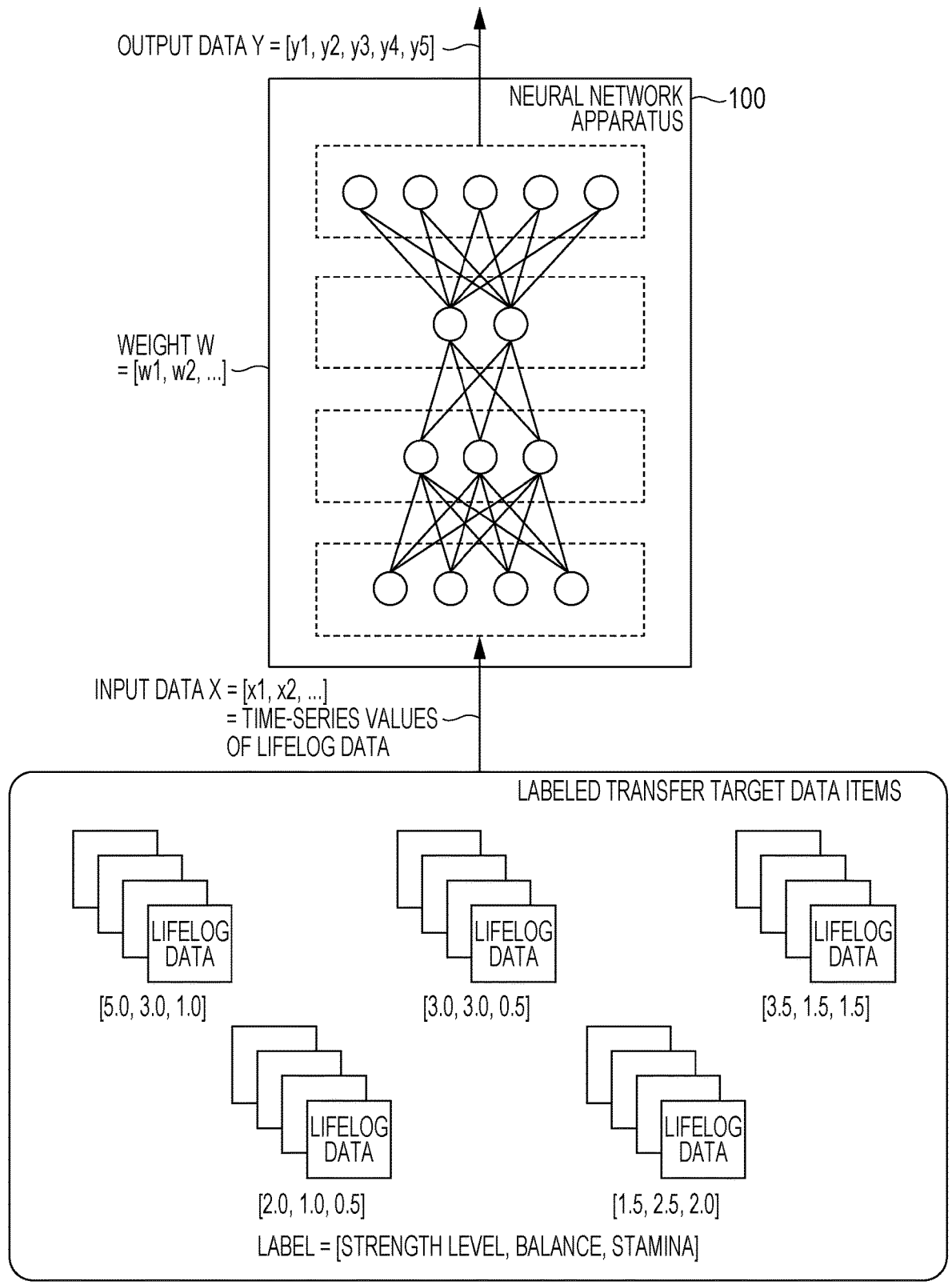
FIG. 9 is a diagram illustrating an example of labeled transfer target data items used in a regression problem.

FIG. 9 is a diagram illustrating an example of labeled transfer target data items used in a regression problem.

In the example illustrated in FIG. 9, the labeled transfer target data items include a plurality of lifelog data items. The lifelog data items are each assigned three labels for attributes "strength level", "balance", and "stamina".

Figure 10A:
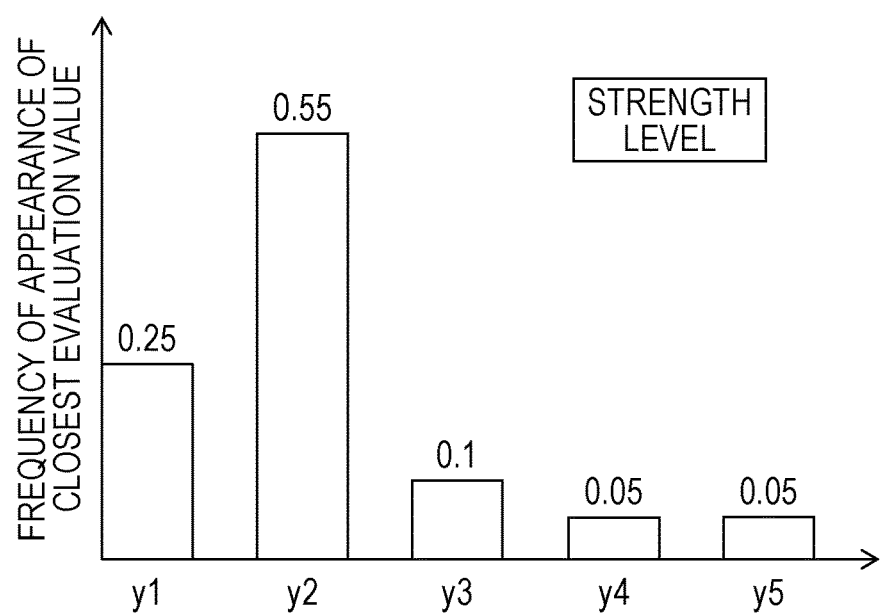
FIG. 10A is a diagram illustrating an example of a distribution of frequencies of appearance of the closest evaluation value for an attribute "strength level"

FIG. 10A is a diagram illustrating an example of a distribution of frequencies of appearance of the closest evaluation value for the attribute "strength level".

Figure 10B:
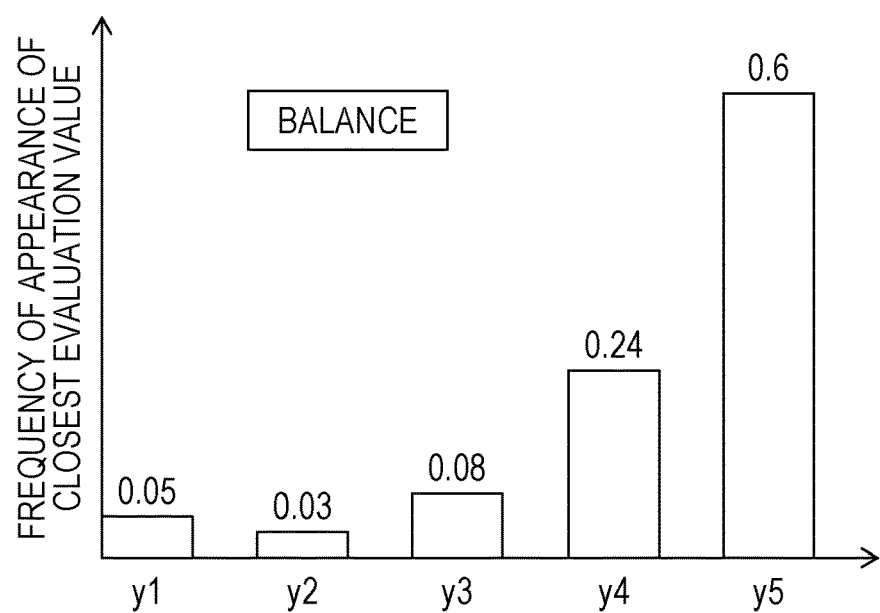
FIG. 10B is a diagram illustrating an example of a distribution of frequencies of appearance of the closest evaluation value for an attribute "balance"

FIG. 10B is a diagram illustrating an example of a distribution of frequencies of appearance of the closest evaluation value for the attribute "balance".

Figure 10C:
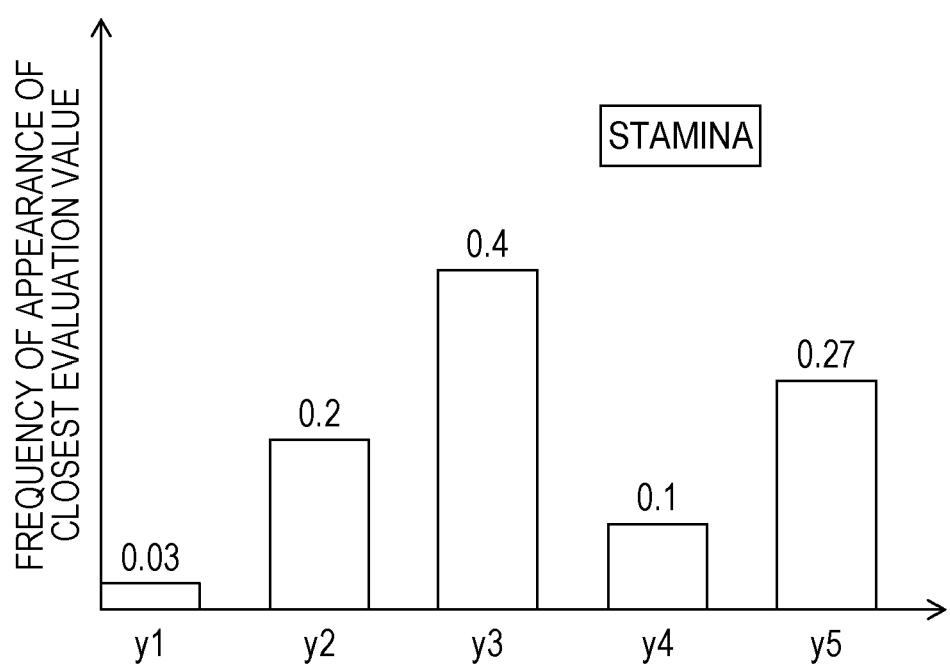
FIG. 10C is a diagram illustrating an example of a distribution of frequencies of appearance of the closest evaluation value for an attribute "stamina"

FIG. 10C is a diagram illustrating an example of a distribution of frequencies of appearance of the closest evaluation value for the attribute "stamina".

The example in FIG. 10A shows a ratio obtained when the plurality of lifelog data items are evaluated, the ratio being a ratio of the number of times each of the output values y1, y2, y3, y4, and y5 of the five output units is the closest to the value of the label "strength level" assigned to the lifelog data items, to the number of lifelog data items that have been evaluated.

For example, suppose that 1000 lifelog data items are evaluated and that the output values y1, y2, y3, y4, and y5 are the closest to the value of the label "strength level" for 250 lifelog data items, 550 lifelog data items, 100 lifelog data items, 50 lifelog data items, and 50 lifelog data items, respectively. In such a case, the distribution of frequencies of appearance of the closest evaluation value illustrated in FIG. 10A is derived.

The examples in FIGS. 10B and 10C respectively show, for the labels "balance" and "stamina", distributions of frequencies of appearance of the closest evaluation value that are derived in a similar manner.

As for the examples in FIGS. 10A, 10B, and 10C, there are $_5P_3=60$ combinations for associating each of the attributes "strength level", "balance", and "stamina" with a different one of the five output units. For example, if the output units that output the output values y2, y5, and y3 are respectively associated with the attributes "strength level", "balance", and "attribute", the sum of the frequencies of appearance of the closest evaluation value for the associated output units is 0.55+0.6+0.4=1.55. This value is larger than the sum of the frequencies of appearance of the closest evaluation value of any other combination. Accordingly, the output layer adjusting unit 220 selects a combination in which the output units that output the output values y2, y5, and y3 are associated with the attributes "strength level", "balance", and "stamina", respectively.

Figure 11:
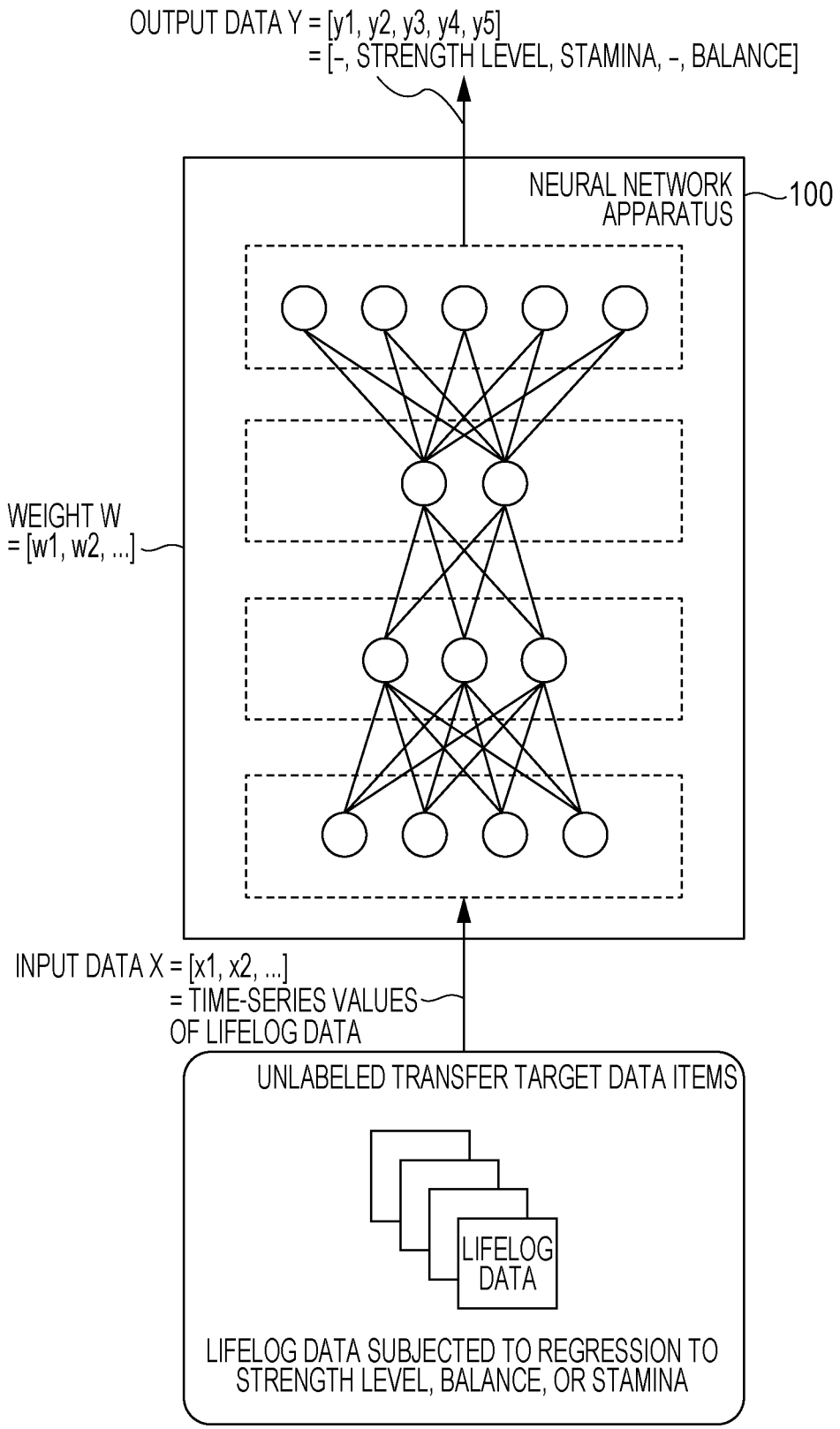
FIG. 11 is a diagram illustrating an example of assignment of output units to the attributes "strength level", "balance", and "stamina"

FIG. 11 is a diagram illustrating an example of assignment of the output units to the attributes "strength level", "balance", and "stamina". In accordance with the selected combination, the output units that output the output values y2, y5, and y3 are assigned as output units for the attributes "strength level", "balance", and "stamina", respectively.

As a result of such assignment, the output values y2, y5, and y3 that are obtained when a new lifelog data item, which is an unlabeled transfer target data item, is input to the neural network apparatus 100 becomes usable as the evaluation value of the lifelog data item for the attributes "strength level", "balance", and "stamina", respectively. In this way, transfer learning to be adaptive to transfer target data items is performed.

As described above, the transfer learning apparatus according to the first embodiment, transfer learning to be adaptive to transfer destination data items is performed through assignment of output units that output evaluation values of respective evaluation items of the transfer target data items by using the configuration and weight values of the neural network apparatus 100 that are set through learning performed using transfer source data items without changing the configuration and weight.

Accordingly, a transfer learning apparatus is obtained which saves the time and effort for changing the configuration and weight values of the neural network apparatus 100 by using transfer target data items during transfer learning and which is free from unwanted effects, such as overfitting and a decrease in the recognition accuracy which may be caused by the configuration and weight value changes.

Although any description has not been given in the first embodiment, the input data input to the neural network apparatus 100 may be subjected to data formatting processing which includes normalization, threshold processing, noise reduction, and data size standardization, for example. Normalization may be performed on the labels as well as the input data. Either the neural network apparatus 100 or the transfer learning apparatus 201 may perform the data formatting processing. The data formatting processing enables transfer learning that implements matching from transfer source data items to transfer target data items at a high rate.

Second Embodiment

A transfer learning apparatus according to a second embodiment is a transfer learning apparatus that not only assigns the output units as described in the first embodiment but also updates, by using as an initial value a weight value obtained as a result of learning based on a plurality of transfer source data items, the weight used in the neural network apparatus through supervised learning based on a plurality of labeled transfer target data items.

Figure 12:
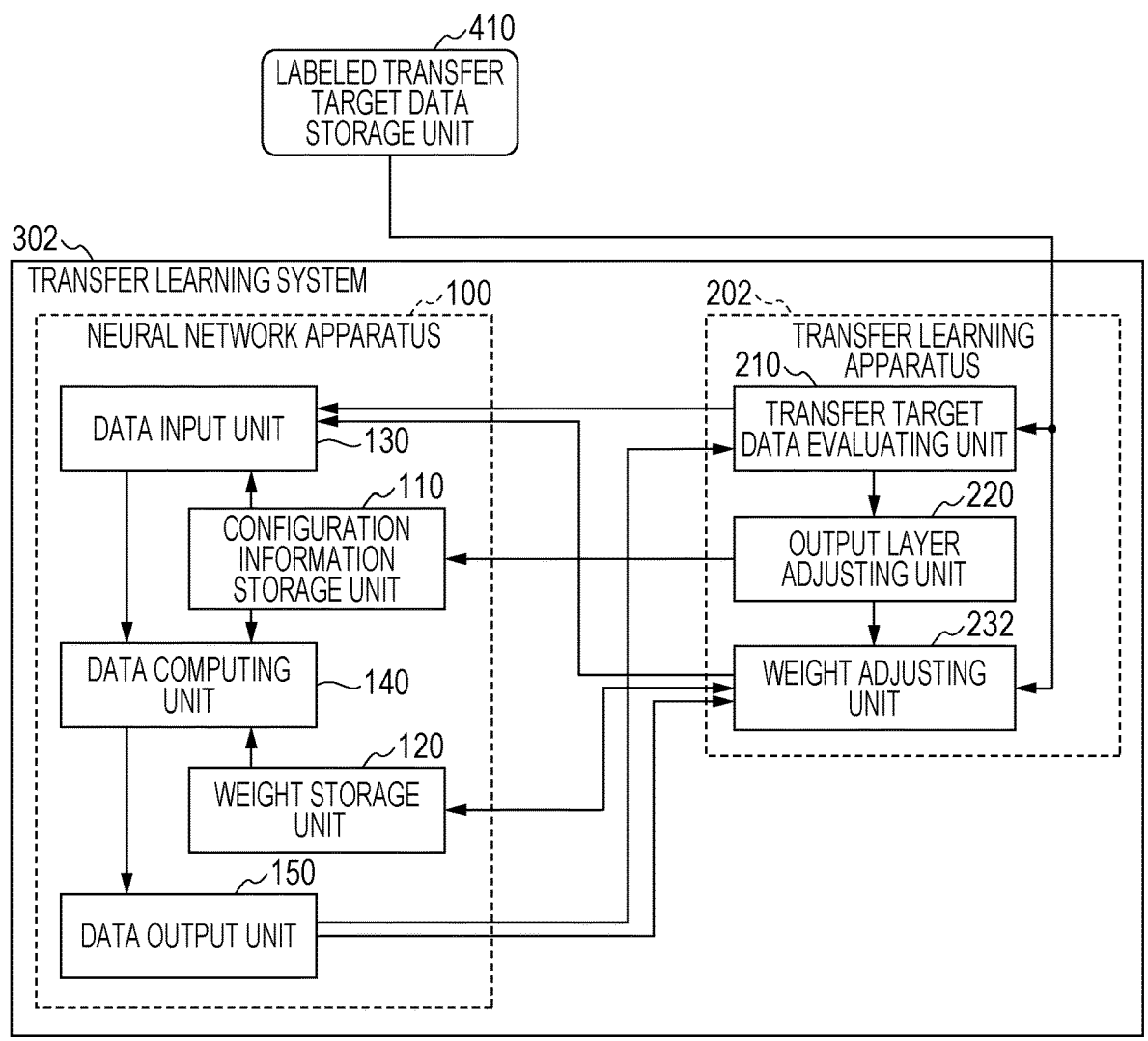
FIG. 12 is a block diagram illustrating an example of a functional configuration of a transfer learning apparatus according to a second embodiment.

FIG. 12 is a block diagram illustrating an example of a functional configuration of a transfer learning apparatus 202 according to the second embodiment. FIG. 12 illustrates, along with the transfer learning apparatus 202, a transfer learning system 302 that is implemented by using the transfer learning apparatus 202.

As illustrated in FIG. 12, the transfer learning apparatus 202 is equivalent to the transfer learning apparatus 201 according to the first embodiment additionally including a weight adjusting unit 232. Hereinafter, constituents that are the same or substantially the same as those of the first embodiment are assigned the same reference signs so as to appropriately omit a description thereof, and additions to the first embodiment will be mainly described.

The weight adjusting unit 232 updates, by using the weight value obtained as a result of learning based on a plurality of transfer source data items as the initial value, the weight value stored in the weight storage unit 120 of the neural network apparatus 100 through supervised learning based on labels of transfer target data items.

An example of an operation performed by the transfer learning apparatus 202 thus configured will be described next.

Figure 13:
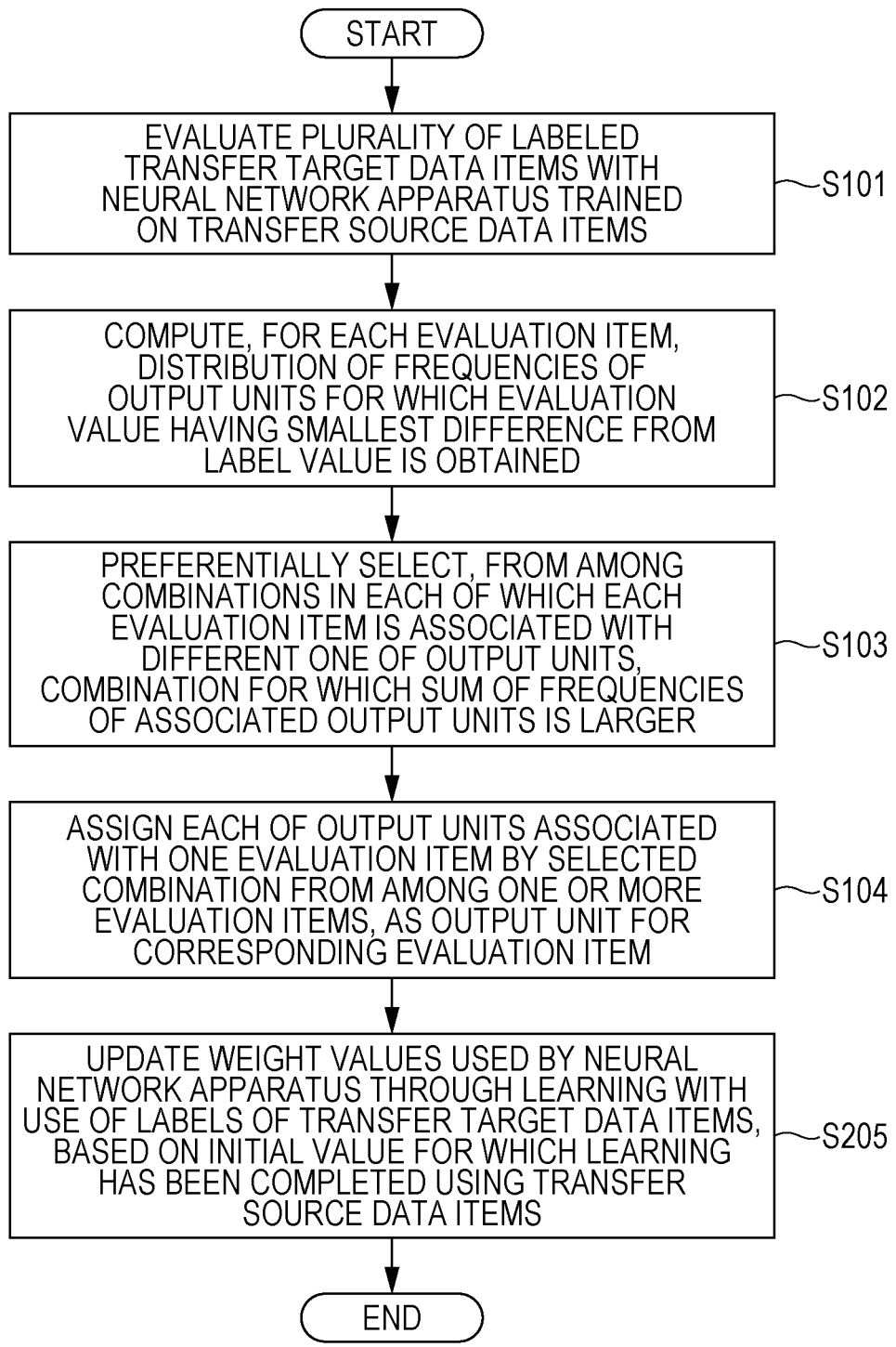
FIG. 13 is a flowchart illustrating an example of transfer learning according to the second embodiment.

FIG. 13 is a flowchart illustrating an example of transfer learning performed by the transfer learning apparatus 202.

As illustrated in FIG. 13, as a result of steps S101 to S104, each of the evaluation items of transfer target data items is assigned a corresponding one of the output units. By assigning the output units that output the evaluation values of the transfer target data items to the corresponding evaluation items, supervised learning using the labels of the transfer target data items can be performed.

The weight adjusting unit 232 obtains a plurality of labeled transfer target data items from the labeled transfer target data storage unit 410. The weight adjusting unit 232 then updates the weight value used by the neural network apparatus 100 through supervised learning based on the plurality of labeled transfer target data items that have been obtained, by using as the initial value the weight value that is obtained as a result of learning based on the plurality of transfer source data items (S205).

As described above, during the supervised learning, for example, a loss function representing an error between the label and the output data Y may be defined by using the input data X, the weight W, and the label, and then the weight W may be updated in accordance with a gradient for decreasing the loss function based on gradient descent.

In particular, in the case where the neural network apparatus 100 is a multi-layer neural network apparatus, the weight values may be adjusted individually for individual layers through unsupervised learning called layer-wise pre-training before the supervised learning is performed. With such a configuration, the weight W that makes evaluation more accurate is obtained by the subsequent supervised learning.

During the unsupervised learning, for example, a loss function representing a certain evaluation value that is not dependent on the label may be defined by using the input data X and the weight W, and then the weight W may be updated in accordance with a gradient for decreasing the loss function based on gradient descent.

In addition, as described in the first embodiment, the input data input to the neural network apparatus 100 may be subjected to data formatting processing which includes normalization, threshold processing, noise reduction, and data size standardization, for example. Normalization may be performed on the labels as well as the input data. Either the neural network apparatus 100 or the transfer learning apparatus 202 may perform the data formatting processing.

As described above, the transfer learning apparatus 202 according to the second embodiment updates, by using the learned weight values as the initial values, the weight values used in the neural network apparatus 100 through learning based on transfer target data items. Accordingly, the transfer learning apparatus 202 is able to suppress overfitting, which may occur when learning is performed by using a small number of transfer target data items without using the learned weight values.

In addition, the weight adjusting unit 232 may update weight values of all the units of the neural network apparatus 100 through learning based on the transfer target data items.

Such a configuration can suppress a decrease in the recognition accuracy that may occur when only the weight values used by some of the units of the neural network apparatus 100 are updated, such as when only the weight values of the units located in the upper layers of a multi-layer neural network apparatus are updated.

Third Embodiment

A transfer learning apparatus according to a third embodiment is a transfer learning apparatus that not only assigns the output units as described in the first embodiment but also updates the weight values used in the neural network apparatus through relearning based only on labels of transfer source data items that are highly related to the evaluation items of transfer target data items, by using the weight values obtained as a result of learning based on the plurality of transfer source data items as the initial values.

Figure 14:
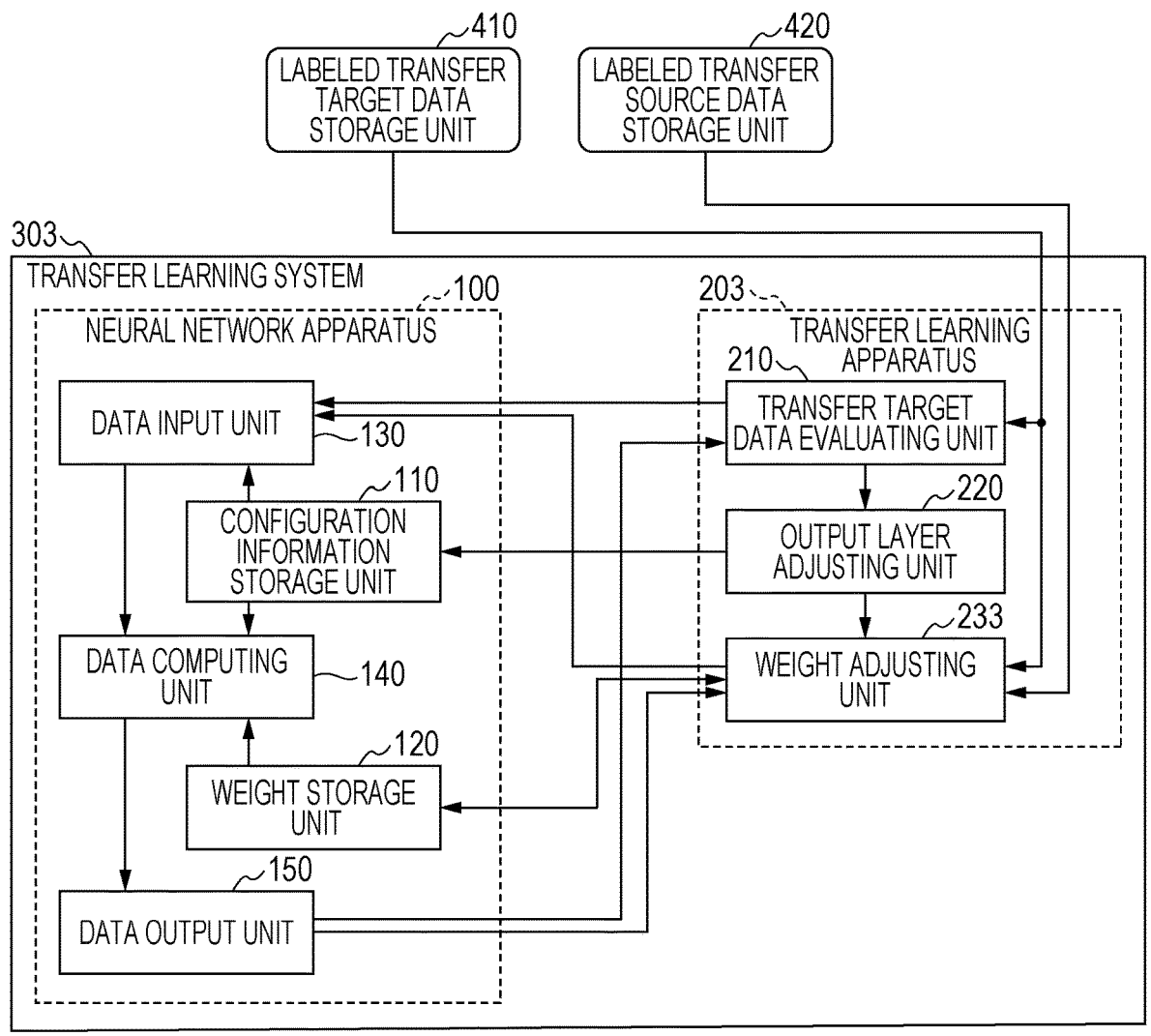
FIG. 14 is a block diagram illustrating an example of a functional configuration of a transfer learning apparatus according to a third embodiment.

FIG. 14 is a block diagram illustrating an example of a functional configuration of a transfer learning apparatus 203 according to the third embodiment. FIG. 14 illustrates, along with the transfer learning apparatus 203, a transfer learning system 303 that is implemented by using the transfer learning apparatus 203, and a labeled transfer source data storage unit 420 that stores a plurality of labeled transfer source data items in a manner such that the transfer learning apparatus 203 is able to obtain the plurality of labeled transfer source data items.

As illustrated in FIG. 14, the transfer learning apparatus 203 is equivalent to the transfer learning apparatus 201 according to the first embodiment additionally including a weight adjusting unit 233. Hereinafter, constituents that are the same or substantially the same as those of the first embodiment are assigned the same reference signs so as to appropriately omit a description thereof, and additions to the first embodiment will be mainly described.

It is assumed that the plurality of transfer source data items stored in the labeled transfer source data storage unit 420 are assigned respective labels each associated with a corresponding one of the output units of the neural network apparatus 100, prior to transfer learning. The plurality of labeled transfer source data items may be transfer source data items used in learning that is performed to set the configuration information and weight W of the neural network apparatus 100 in advance. It is also assumed that information indicating correspondences between one of the evaluation items of the labeled transfer source data items and a corresponding one of the output units of the neural network apparatus 100 is stored, for example, in the configuration information storage unit 110 of the neural network apparatus 100 during learning performed by using the plurality of labeled transfer source data items.

The weight adjusting unit 233 updates the weight values stored in the weight storage unit 120 of the neural network apparatus 100 by further performing supervised learning based only on related labels, which are labels assigned the output units by the output layer adjusting unit 220 from among the labels of the transfer source data items, by using the weight values obtained as a result of learning performed using the plurality of transfer source data items as the initial values.

An example of an operation performed by the transfer learning apparatus 203 thus configured will be described next.

Figure 15:
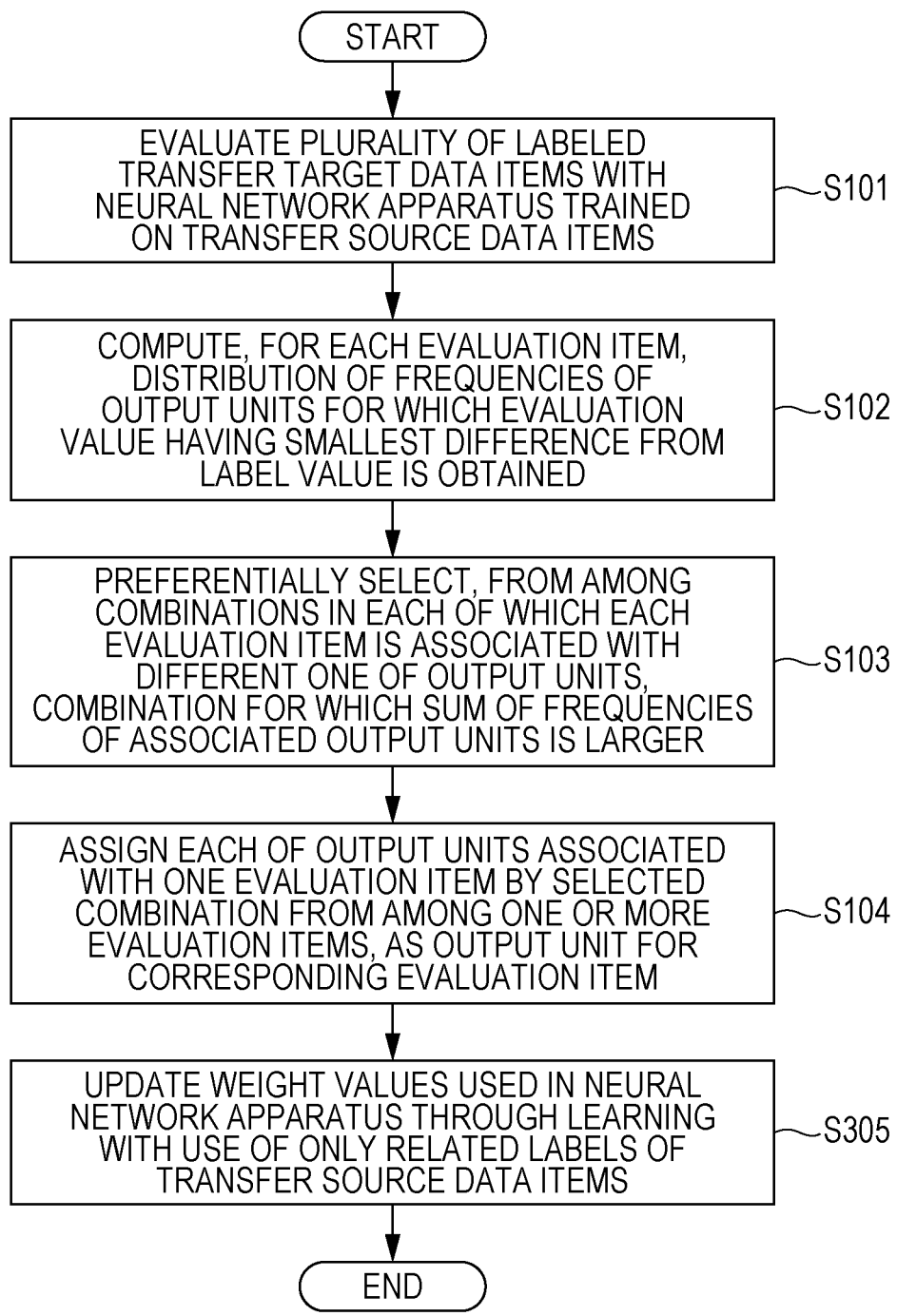
FIG. 15 is a flowchart illustrating an example of transfer learning according to the third embodiment.

FIG. 15 is a flowchart illustrating an example of transfer learning performed by the transfer learning apparatus 203.

As illustrated in FIG. 15, as a result of steps S101 to S104, each of the evaluation items of transfer target data items is assigned a corresponding one of the output units.

The weight adjusting unit 233 obtains the plurality of labeled transfer source data items from the labeled transfer source data storage unit 420. The weight adjusting unit 233 then updates, by using the weight values obtained as a result of learning based on the plurality of transfer source data items as the initial values, the weight values used in the neural network apparatus 100 through supervised learning based only on the related labels of the plurality of transfer source data items that have been obtained (S305).

Figure 16:
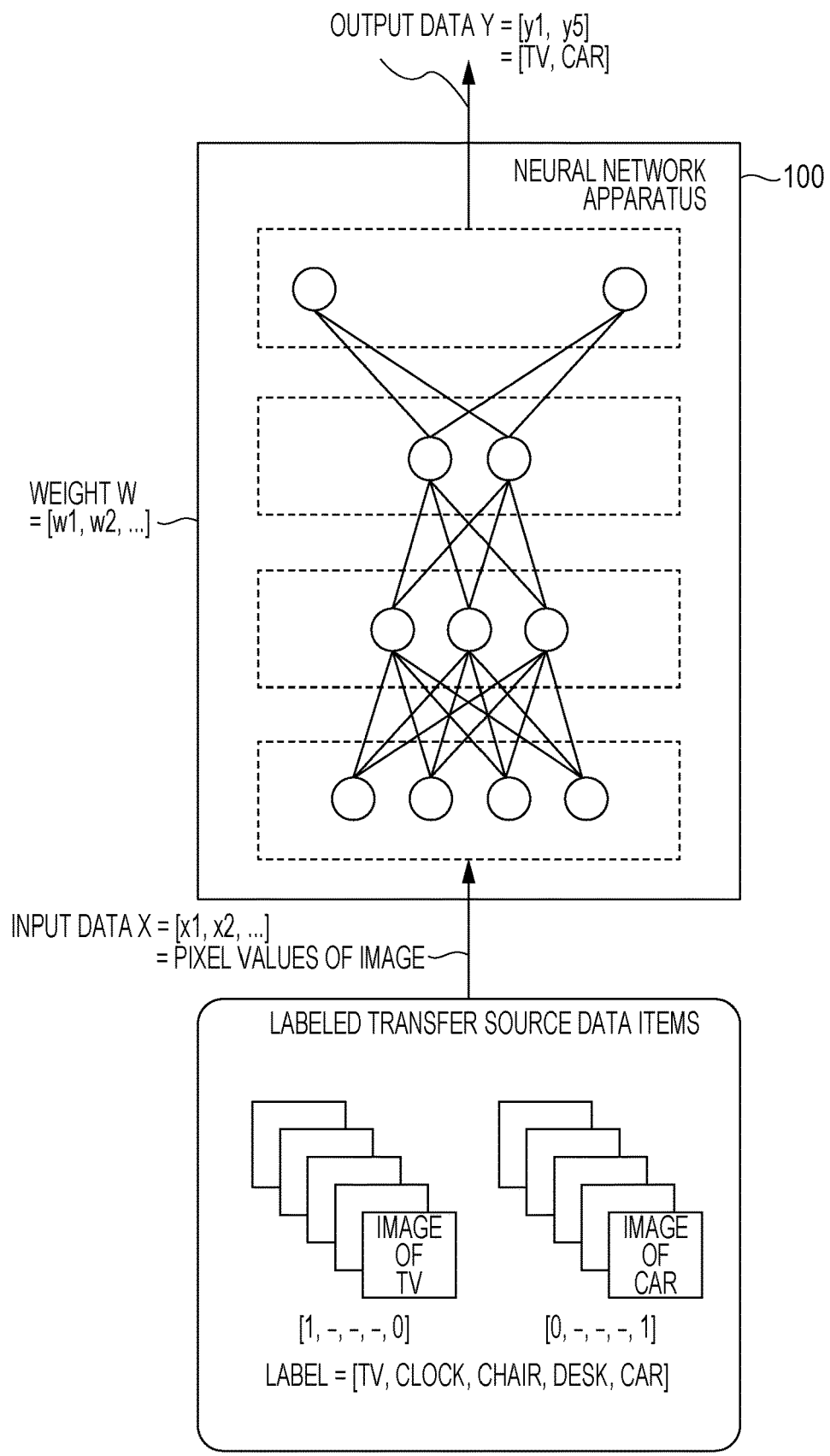
FIG. 16 is a diagram illustrating an example of related labels of transfer source data items used in a classification problem.

FIG. 16 is a diagram illustrating an example of the related labels of the transfer source data items used in a classification problem.

In the example illustrated in FIG. 16, the related labels of the transfer source data items are labels "TV" and "car" that are respectively associated with the output units that output the output values y1 and y5 on the basis of the assignment of the output units illustrated in FIG. 8.

The weight adjusting unit 233 adjusts the weight W used in the neural network apparatus 100 through supervised learning based only on the labels "TV" and "car" from among the labels "TV", "clock", "chair", "desk", and "car".

Only the labels "TV" and "car" are used in supervised learning for the classification problem. That is, the transfer source data items of the categories "clock", "chair", and "desk" respectively assigned the labels "clock", "chair", and "desk" having a value of 1 are not used, and only the transfer source data items of the categories "TV" and "car" are used.

During the supervised learning, for example, a loss function representing errors between the labels "TV" and "car" and element values [y1, y5] of the output data Y, respectively, may be defined by using the input data X, the weight W, and the labels "TV" and "car", and then the weight W may be updated in accordance with a gradient for decreasing the loss function based on gradient descent.

The supervised learning is substantially the same as training the neural network apparatus 100 illustrated in FIG. 16 from which the output units for the categories "clock", "chair", and "desk" are removed. That is, the weight W is updated without any constraint imposed by the labels "clock", "chair", and "desk". Accordingly, a decrease in the recognition accuracy which may be caused by the labels "clock", "chair", and "desk" serving as noise may be effectively suppressed. Such an effect becomes more significant as the number of output units that are not assigned by the output layer adjusting unit 220 increases, that is, as the number of labels that possibly serve as noise increases.

A specific example regarding the classification problem has been described above. As for a regression problem, transfer learning based only on the related labels is performed in a similar procedure.

Figure 17:
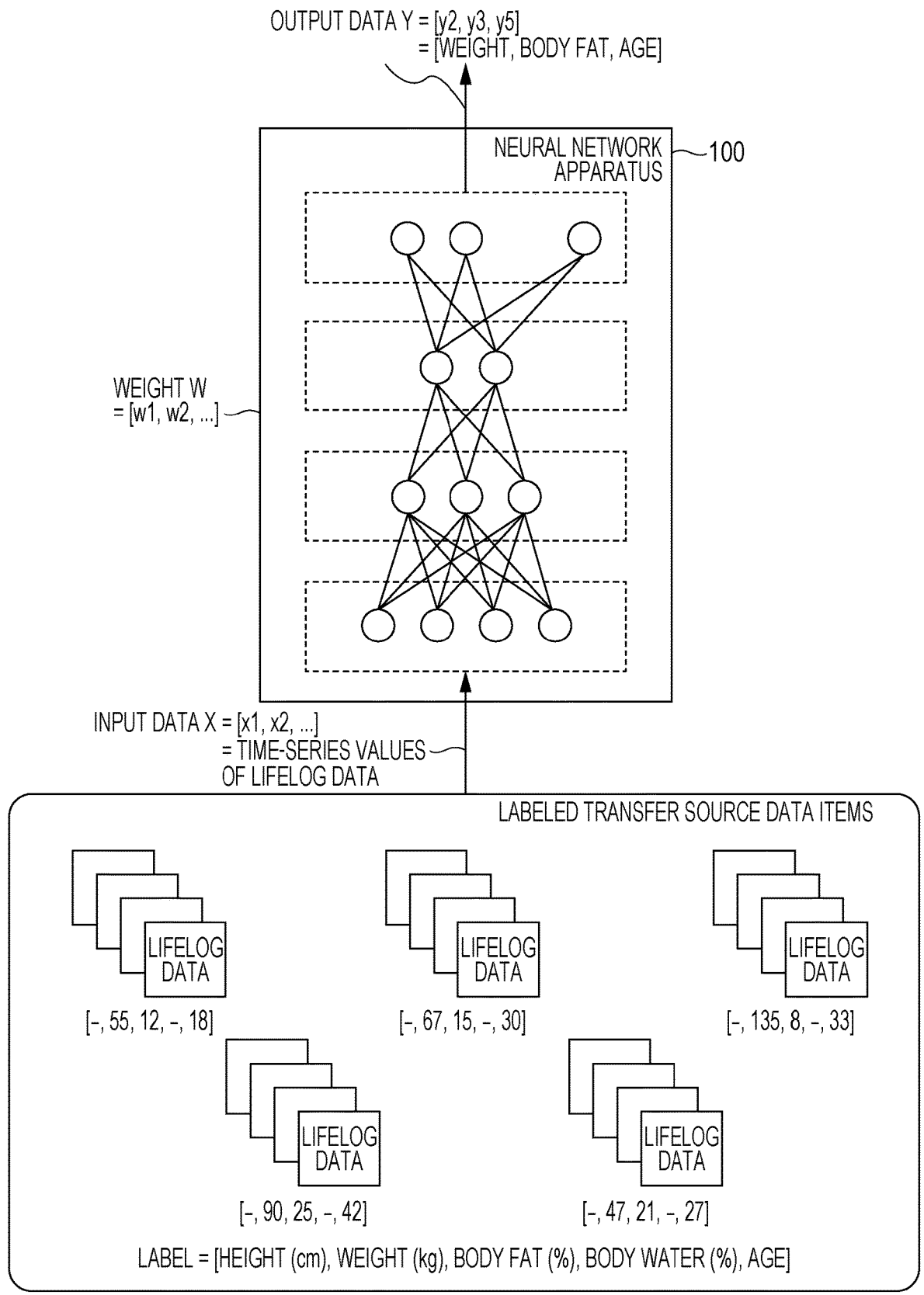
FIG. 17 is a diagram illustrating an example of related labels of transfer source data items used in a regression problem.

FIG. 17 is a diagram illustrating an example of the related labels of the transfer source data items used in a regression problem.

In the example illustrated in FIG. 17, the related labels of the transfer source data items are labels "weight", "body fat", and "age" that are respectively associated with the output units that output the output values y2, y3, and y5 on the basis of the assignment of the output units illustrated in FIG. 17.

The weight adjusting unit 233 adjusts the weight W used in the neural network apparatus 100 through supervised learning based only on the labels "weight", "body fat", and "age" from among the labels "height", "weight", "body fat", "body water", and "age".

All the transfer source data items are used in the supervised learning for the regression problem.

In addition, during the supervised learning, a loss function representing errors between the labels "weight", "body fat" and "age" and element values [y2, y3, y5] of the output data Y, respectively, may be defined by using the input data X, the weight W, and the labels "weight", "body fat", and "age", and then the weight W may be updated in accordance with a gradient for decreasing the loss function based on gradient descent.

The supervised learning is substantially the same as training the neural network apparatus 100 illustrated in FIG. 17, which is the neural network apparatus 100 illustrated in FIG. 3 from which the output units for the attributes "height" and "body water" are removed. That is, the weight W is updated without any constraint imposed by the labels "height" and "body water", Accordingly, a decrease in the recognition accuracy which may be caused by the labels "height" and "body water" serving as noise may be effectively suppressed. Such an effect becomes more significant as the number of output units that are not assigned by the output layer adjusting unit 220 increases, that is, as the number of labels that possibly serve as noise increases.

As described in the first embodiment, the input data input to the neural network apparatus 100 may be subjected to data formatting processing which includes normalization, threshold processing, noise reduction, and data size standardization, for example, in either case of the classification problem or the regression problem. Normalization may be performed on the labels as well as the input data. Either the neural network apparatus 100 or the transfer learning apparatus 203 may perform the data formatting processing.

In addition, when the above-described supervised learning based only on the related labels is performed, the output units that are not assigned by the output layer adjusting unit 220 may be removed by changing the configuration information of the neural network apparatus 100.

As described above, the transfer learning apparatus 203 according to the third embodiment updates the weight values obtained as a result of learning based on a plurality of transfer source data items, through relearning based only on labels of the transfer source data items that are highly related to the evaluation items of transfer target data items. Such a configuration can suppress a decrease in the recognition accuracy which may be caused as a result of the labels of the transfer source data items that are not highly related to the evaluation items of the transfer target data items serving as noise.

Note that assignment of the output units described in the first embodiment and learning based on transfer target data items described in the second embodiment may be combined with the above-described relearning based only the related labels of the transfer source data items. For example, the output units may be assigned by evaluating transfer target data items by using a neural network apparatus that has been trained by using transfer source data items. Then, relearning based only on the related labels of the transfer source data items may be performed. Then, learning based on transfer target data items may be performed.

Fourth Embodiment

A transfer learning apparatus according to a fourth embodiment is a transfer learning apparatus that not only assigns the output units as described in the first embodiment and performs learning based on transfer target data items described in the second embodiment but also detects that transfer learning is deficient in the neural network apparatus to be adaptive to at least the transfer target data items. In the fourth embodiment, additional learning that is performed upon detection of deficiency in learning will be also described.

Figure 18:
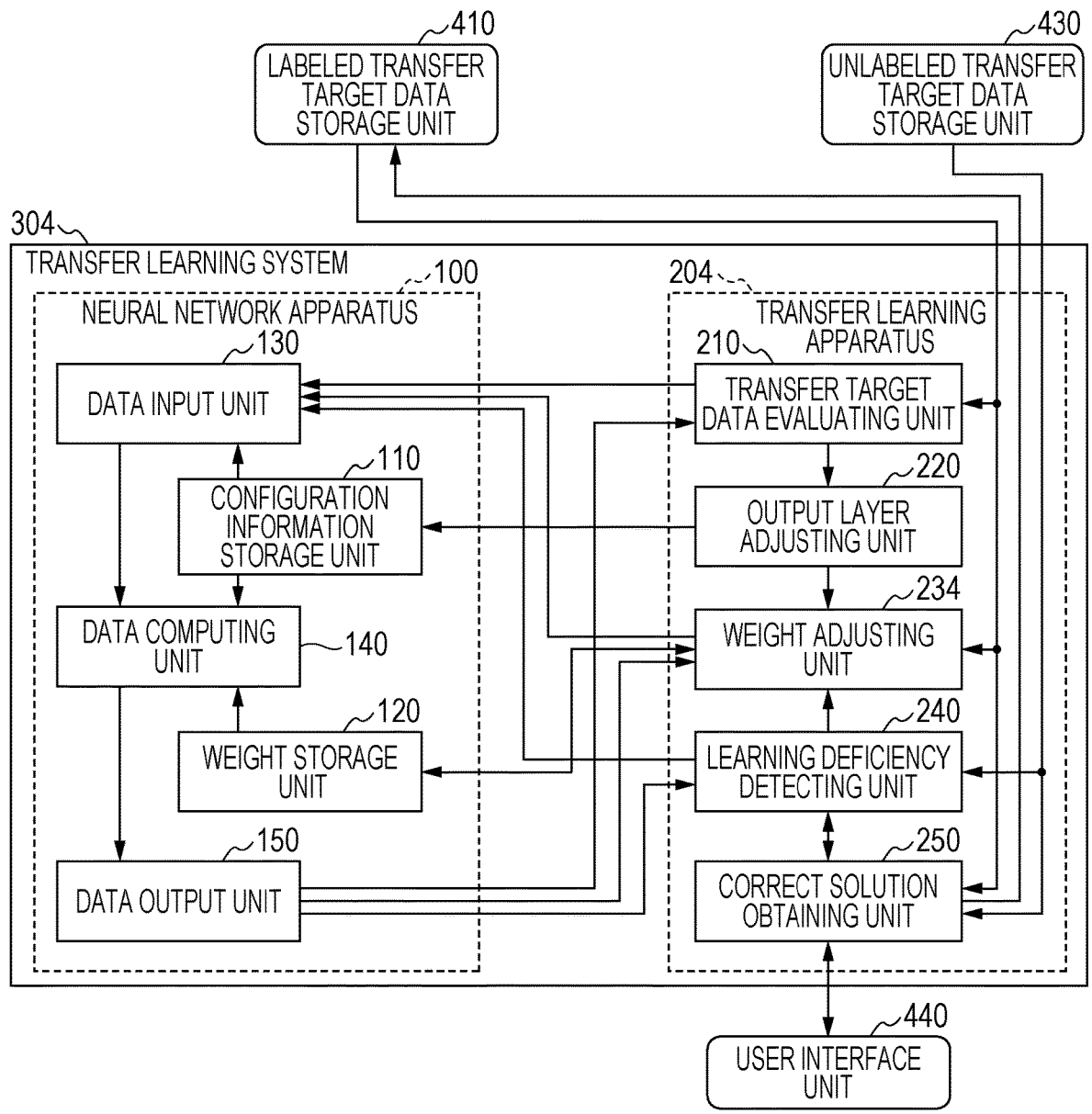
FIG. 18 is a block diagram illustrating an example of a functional configuration of a transfer learning apparatus according to a fourth embodiment.

FIG. 18 is a block diagram illustrating an example of a functional configuration of a transfer learning apparatus 204 according to the fourth embodiment. FIG. 18 illustrates, along with the transfer learning apparatus 204, a transfer learning system 304 implemented by using the transfer learning apparatus 204, an unlabeled transfer target data storage unit 430, and a user interface unit 440. The unlabeled transfer target data storage unit 430 stores a plurality of unlabeled transfer target data items in a manner such that the transfer learning apparatus 204 is able to obtain the plurality of unlabeled transfer target data items. The user interface unit 440 presents data to a user and accepts data from the user.

As illustrated in FIG. 18, compared to the transfer learning apparatus 202 according to the second embodiment, the transfer learning apparatus 204 additionally includes a weight adjusting unit 234 which is a modification of the weight adjusting unit 232, a learning deficiency detecting unit 240, and a correct solution obtaining unit 250. Hereinafter, constituents that are the same or substantially the same as those of the first and second embodiments are assigned the same reference signs so as to appropriately omit a description thereof, and additions to the first and second embodiments will be mainly described.

The learning deficiency detecting unit 240 obtains evaluation values output from unrelated units, which are the output units not assigned by the output layer adjusting unit 220, by inputting one or more unlabeled transfer target data items to the neural network apparatus 100. The learning deficiency detecting unit 240 then detects deficiency in learning on the basis of deviation of the evaluation values from a reference range.

As the reference range, a range of values that contradict with the output values of the unrelated units may be used. Before detection of deficiency in learning, for example, the neural network apparatus 100 may be trained so that the output values of the unrelated units are equal to a specific value, such as 0, during learning performed using the transfer target data items. In this case, deficiency in learning is detected when the evaluation value deviates from the reference range including the specific value (for example, exceeds a certain threshold).

When the learning deficiency detecting unit 240 detects deficiency in learning based on an unlabeled transfer target data item, the correct solution obtaining unit 250 presents the unlabeled transfer target data item or an associative data item (described later) of the unlabeled transfer target data item to a user and accepts a label for the unlabeled transfer target data item from the user. The correct solution obtaining unit 250 then may assign the label accepted from the user to the unlabeled transfer target data item to generate a labeled transfer target data item and may store the labeled transfer target data item in the labeled transfer target data storage unit 410.

The weight adjusting unit 234 updates the weight values used in the neural network apparatus 100 through supervised learning based on the label accepted by the user and the unlabeled transfer target data item.

The user interface unit 440 may include, for example, a display, a touchscreen, a keyboard, and a mouse.

An example of an operation performed by the transfer learning apparatus 204 thus configured will be described next.

Figure 19:
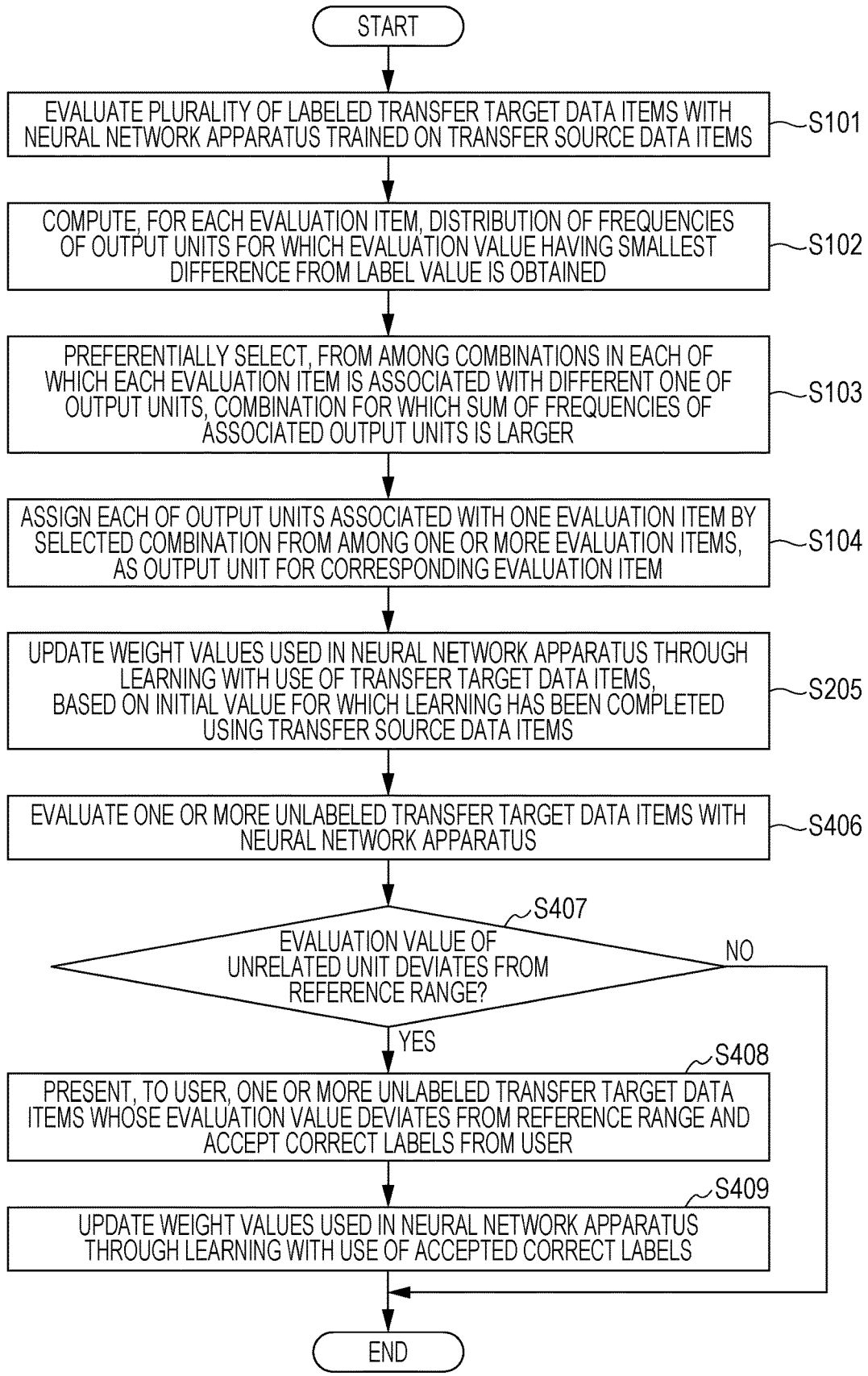
FIG. 19 is a flowchart illustrating an example of transfer learning according to the fourth embodiment.

FIG. 19 is a flowchart illustrating an example of transfer learning performed by the transfer learning apparatus 204.

As illustrated in FIG. 19, as a result of steps S101 to S104, each of the evaluation items of transfer target data items is assigned a corresponding one of the output units. In step S205, learning is performed by using the transfer target data items.

The learning deficiency detecting unit 240 obtains one or more unlabeled transfer target data items from the unlabeled transfer target data storage unit 430, inputs the one or more unlabeled transfer target data items to the neural network apparatus 100, and obtains evaluation values output from the unrelated units (S406). The learning deficiency detecting unit 240 then detects whether learning is deficient in the neural network apparatus 100 on the basis of whether the evaluation values deviate from the reference range (S407).

If deviation of the evaluation values from the reference range (that is, deficiency in learning) is detected (YES in S407), the correct solution obtaining unit 250 presents, to the user via the user interface unit 440, the unlabeled transfer target data items for which the evaluation value deviates from the reference range or associative information of the transfer target data items, and accepts labels for the transfer target data items from the user (S408).

The weight adjusting unit 234 updates the weight values used in the neural network apparatus 100 through supervised learning based on the labels accepted from the user and the unlabeled transfer target data items (S409).

Figure 20:
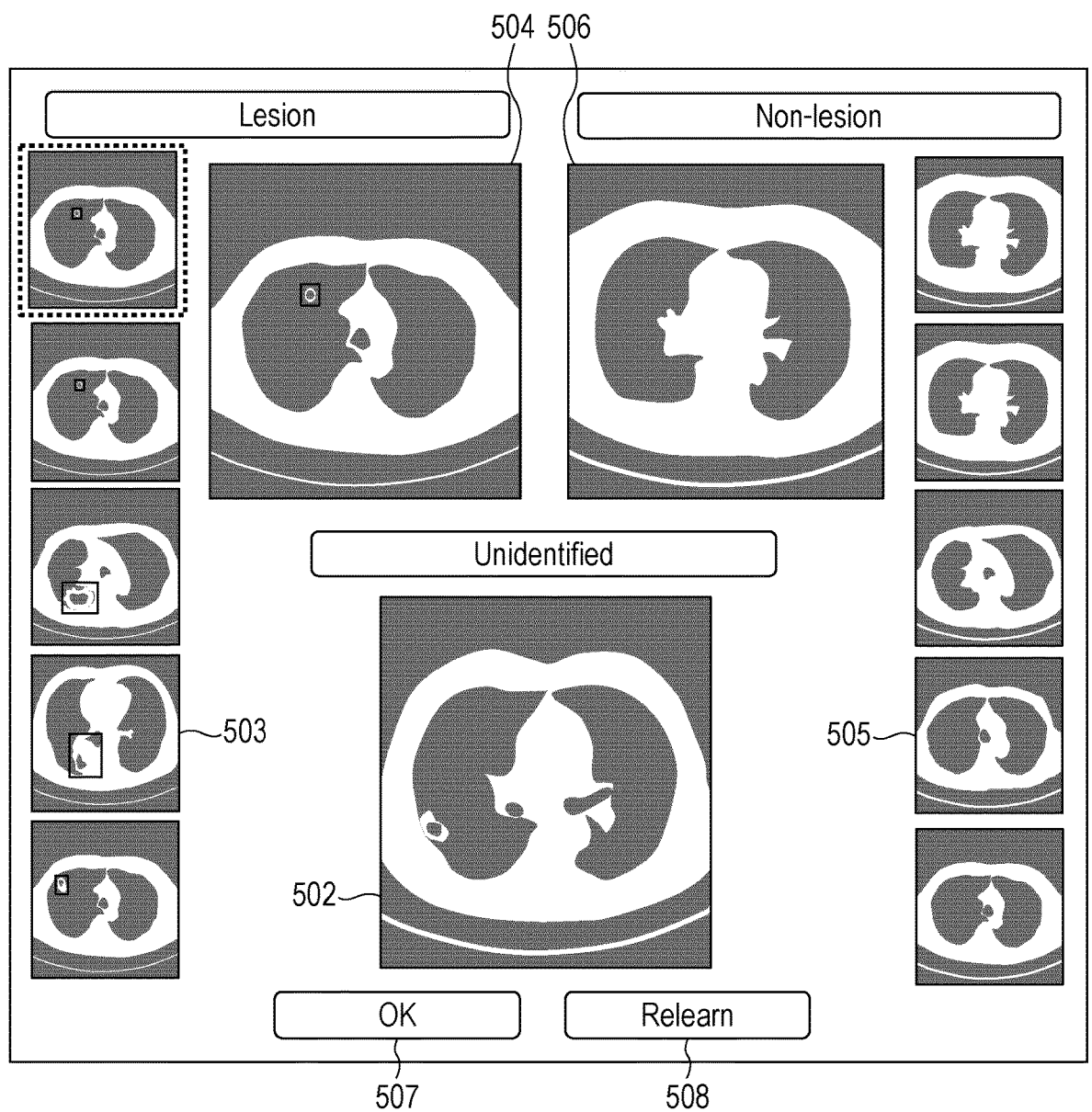
FIG. 20 is a diagram illustrating an example of a selection screen presented to a user.

FIG. 20 is a diagram illustrating an example of a selection screen presented to the user via the user interface unit 440. An image group 503 includes lesion images stored in the labeled transfer target data storage unit 410, and an image group 505 includes non-lesion images stored in the labeled transfer target data storage unit 410. Images 504 and 506 are enlarged images of images respectively selected by the user from the image groups 503 and 505. An image 502 is an unlabeled transfer target data item (hereinafter, referred to as an input image 502) for which the evaluation value output from the unrelated unit deviates from the reference range.

The user selects an image that is considered to be classified into the same category as the input image 502 from the image groups 503 and 505, and then presses an OK button 507. In response to pressing of the OK button 507, a labeled transfer target data item, which is obtained by labeling the unlabeled transfer target data item with the label of the selected image, is stored in the labeled transfer target data storage unit 410.

In response to pressing of a relearn button 508, the weight W used in the neural network apparatus 100 is readjusted by using the labeled transfer target data items stored in the labeled transfer target data storage unit 410.

In response to pressing of the OK button 507, a new labeled transfer target data item is stored in the labeled transfer target data storage unit 410. In response to pressing of the relearn button 508, the weight W is readjusted. In this way, more accurate classification can be performed for an unlabeled transfer target data item for which classification has failed.

The case where unlabeled transfer target data items are time-series values of, for example, acceleration or angular velocity, such as the aforementioned lifelog data items, will now be described. Unlike the image information described above, it is difficult for the user to directly specify values of the labels "strength level", "balance", and "stamina" even if such lifelog data items are presented to the user.

Accordingly, lifelog data items that are assigned, in addition to the labels, associative data items to be referred to in order for the user to presume labels of transfer target data items are stored in the labeled transfer target data storage unit 410. The associative data items are presented to the user to assist the user in specifying the labels.

For example, workflow data is used as the associative data items. Workflow data indicates an evaluation value, such as a balance scale, that is measured during rehabilitation at a medical facility, for example.

FIG. 21 is a diagram illustrating an example of the workflow data. The workflow data illustrated in FIG. 21 includes a plurality of test items related to the motor function of a patient. For example, the patient's risk of fall is evaluated in accordance with results of these test items.

Transfer target data items for which it is difficult for the user to directly specify labels, such as lifelog data items, are assigned associative data items, such as results (for example, "Yes" or "No") of the test items of the workflow data and are stored in the labeled transfer target data storage unit 410.

Figure 22:
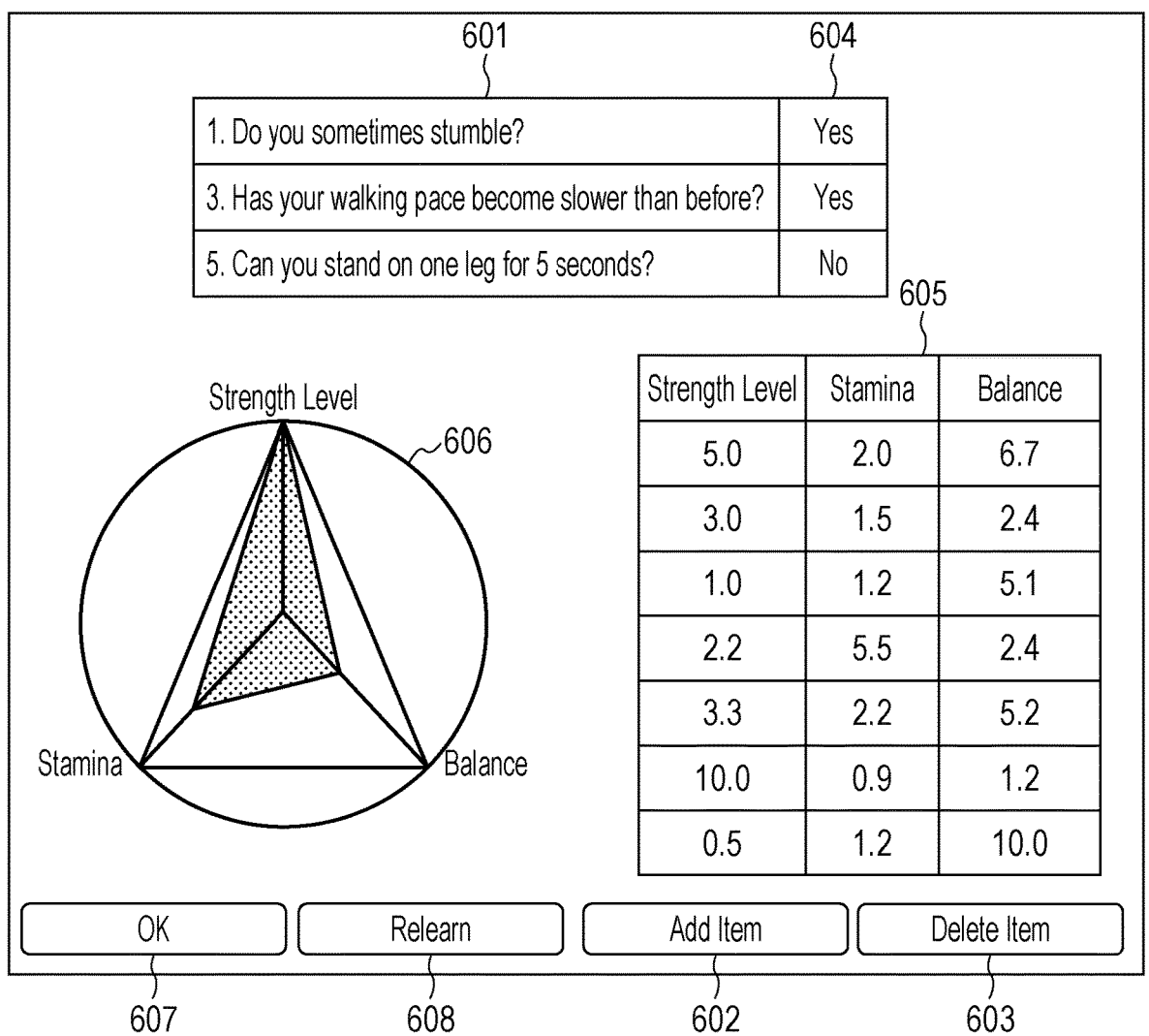
FIG. 22 is a diagram illustrating an example of a selection screen presented to a user.

FIG. 22 is a diagram illustrating an example of a selection screen presented to a user via the user interface unit 440. In the example illustrated in FIG. 22, information regarding one unlabeled transfer target data item for which deficiency in learning has been detected is displayed. The unlabeled transfer target data item may be, for example, a lifelog data item; however, the lifelog data item itself is not displayed in this screen.

Test items 601 are one or more test items selected by the user from among the test items included in the workflow data. The user inputs result values 604 for the test items as associative data items, for example, by asking the patient, for whom the unlabeled transfer target data item is obtained, to perform actions indicated by the test items 601 or by asking the patient about the test items 601.

For example, suppose that "Yes", "Yes", and "No" are respectively input for the first test item, the second test item, and the third test item.

In response to the input, the correct solution obtaining unit 250 obtains one or more labeled transfer target data items assigned the same associative data items as the value of the input result 604 of the test item from among the labeled transfer target data items stored in the labeled transfer target data storage unit 410. The correct solution obtaining unit 250 may obtain one or more labeled transfer target data items assigned associative data items that are close to (that is, that have a difference smaller than a certain threshold) the value of the input result 604 of the test item.

The correct solution obtaining unit 250 presents, to the user via the user interface unit 440, a label group 605 that includes labels assigned to the obtained transfer target data items. A label chart 606 displays, in a chart format, labels selected by the user from among the label group 605.

In response to pressing of an add item button 602, the test item 601 is added. In response to pressing of a delete item button 603, the test item 601 is deleted. The add item button 602 and the delete item button 603 are used when the label group 605 that is displayed in accordance with the displayed test items 601 is deficient and excessive, respectively.

The user selects, from among the label group 605, a label that is considered to be the closest to the correct attribute value of the unlabeled transfer target data item for which deficiency in learning is detected, and then presses an OK button 607. In response to pressing of the OK button 607, a labeled transfer target data item, which is the unlabeled transfer target data item assigned the selected label, is stored in the labeled transfer target data storage unit 410.

In addition, in response to pressing of a relearn button 608, the weight W used in the neural network apparatus 100 is readjusted by using the labeled transfer target data items stored in the labeled transfer target data storage unit 410.

In response to pressing of the OK button 607, a new labeled transfer target data item is stored in the labeled transfer target data storage unit 410. In response to pressing of the relearn button 608, the weight W is readjusted. In this way, more accurate regression can be performed for an unlabeled transfer target data item for which regression has failed.

As described above, an unlabeled transfer target data item for which deficiency in learning is detected or an associative data item of the unlabeled transfer target data item is presented to the user. A label of the unlabeled transfer target data item is accepted from the user. In this way, additional learning for coping with deficiency in learning can be performed.

In particular, in the case where it is difficult to directly specify a label of the unlabeled transfer target data item, the user is permitted to specify the label of the unlabeled transfer target data item on the basis of the associative data item. In this way, additional learning is performed by using the label and the unlabeled transfer target data item.

A description will now be given of the case where a common label is specified collectively for a plurality of unlabeled transfer target data items for which deficiency in learning is detected. An example will be described below in which a plurality of unlabeled transfer target data items whose evaluation values output from the same unrelated unit deviate from the reference range or associative data items of the plurality of unlabeled transfer target data items are presented to a user, and a label common to the plurality of unlabeled transfer target data items is accepted from the user.

Figure 23:
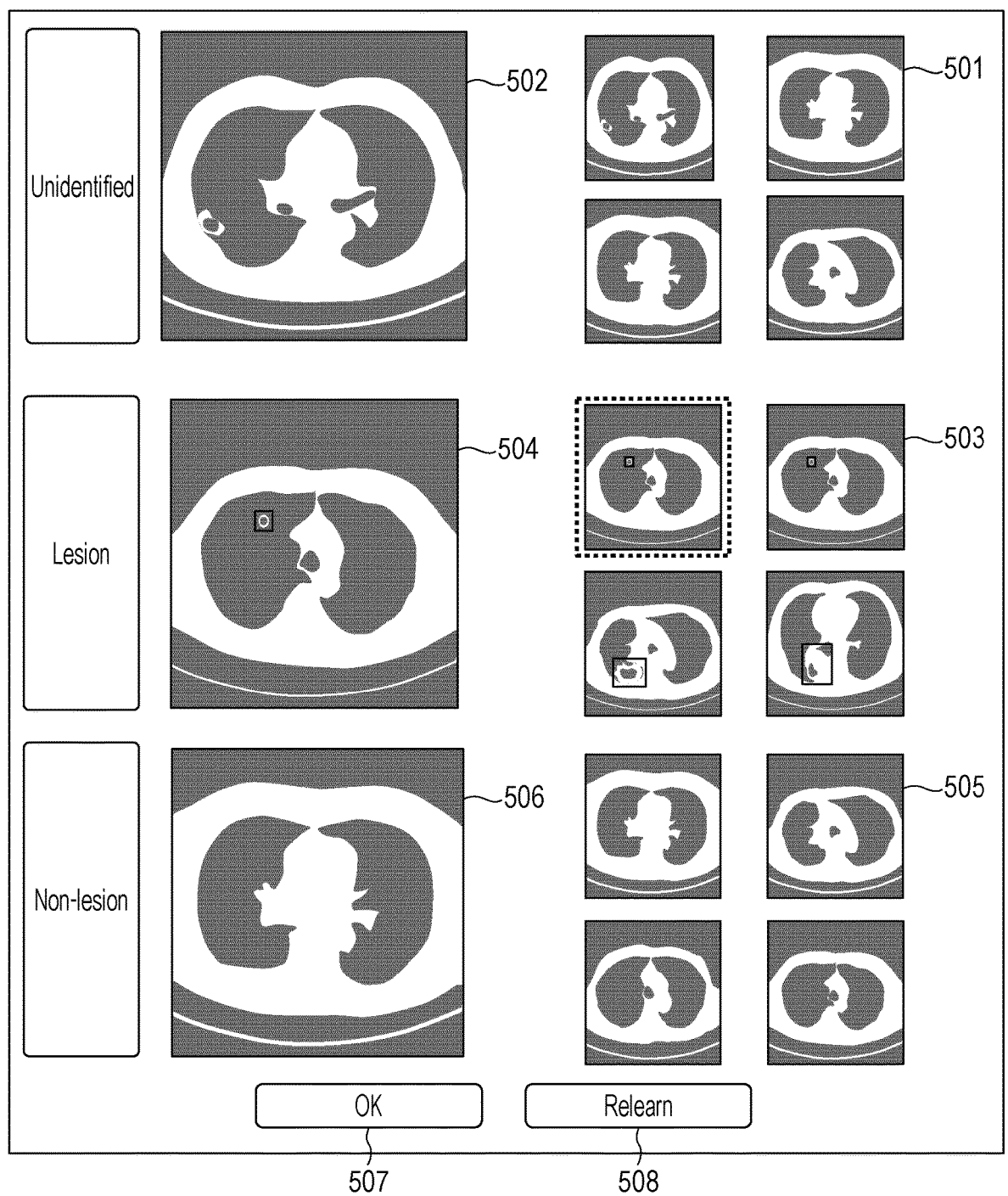
FIG. 23 is a diagram illustrating an example of a selection screen presented to a user.

FIG. 23 is a diagram illustrating an example of a selection screen presented to a user via the user interface unit 440. An image group 501 includes images whose evaluation values output from the same unrelated unit deviate from the reference range. The image group 503 includes lesion images stored in the labeled transfer target data storage unit 410, and the image group 505 includes non-lesion images stored in the labeled transfer target data storage unit 410. In addition, the images 502, 504, and 506 are enlarged images of images selected by the user respectively from the image groups 501, 503, and 505.

If the user determines that all the images included in the image group 501 are classified into a single category as a result of observation of these images, the user selects an image belonging to the category from among the image groups 503 and 505 and then presses the OK button 507. In response to pressing of the OK button 507, labeled transfer target data items, which are the images included in the image group 501 assigned the label of the selected image, are stored in the labeled transfer target data storage unit 410.

In addition, in response to pressing of the relearn button 508, the weight W used in the neural network apparatus 100 is readjusted by using the labeled transfer target data items stored in the labeled transfer target data storage unit 410. At that time, the output layer adjusting unit 220 may remove the unrelated unit that has output the evaluation values deviating from the reference range for the images included in the image group 501 before the weight W is readjusted.

The contents described above is regarding the classification problem. The case of the regression problem will be described next.

Figure 24:
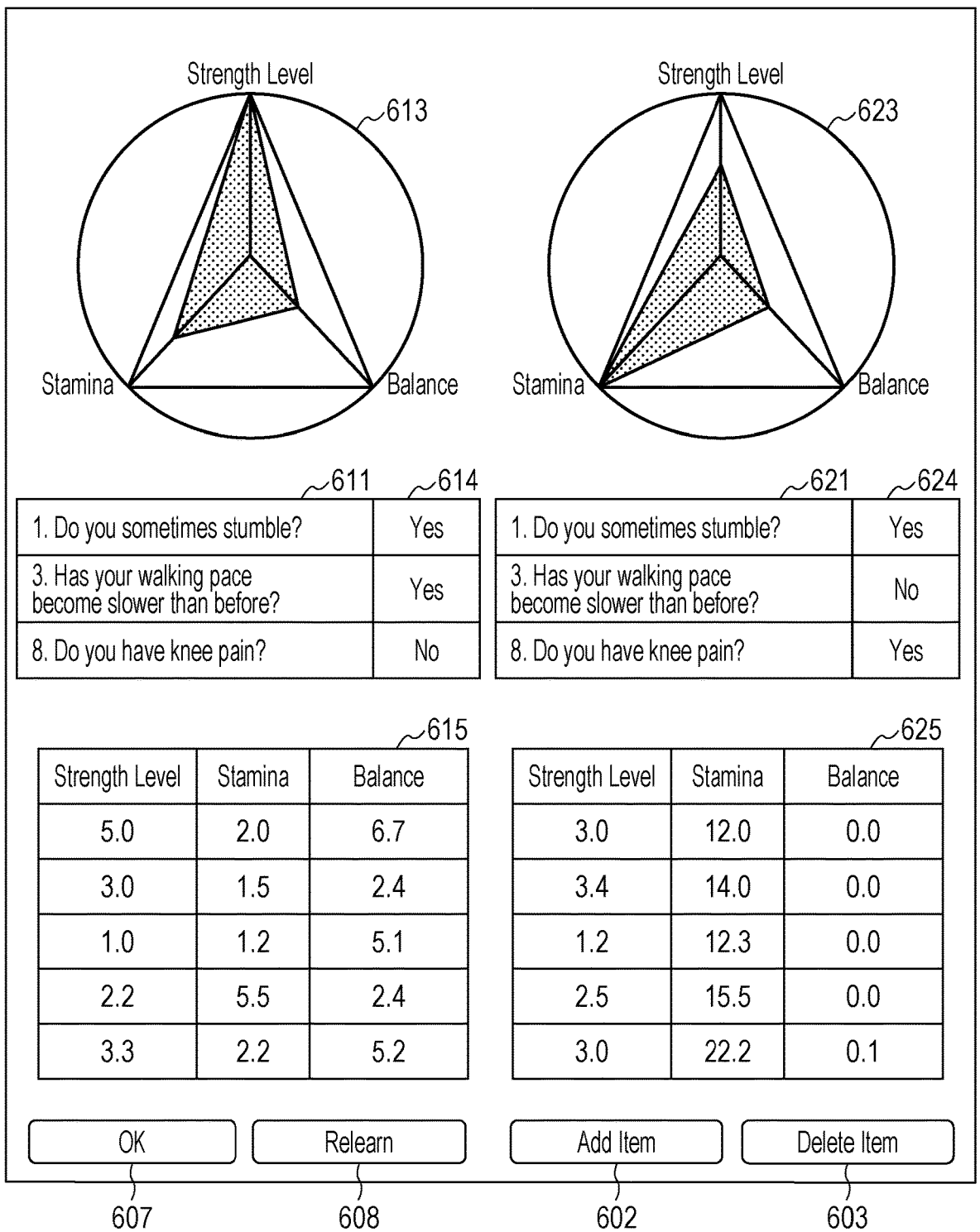
FIG. 24 is a diagram illustrating an example of a selection screen presented to a user.

FIG. 24 is a diagram illustrating an example of a selection screen presented to a user via the user interface unit 440. In the example illustrated in FIG. 24, pieces of information regarding two unlabeled transfer target data items whose evaluation values output from the same unrelated unit deviate from the reference range are displayed in the screen side by side. The unlabeled transfer target data items may be, for example, lifelog data items; however, the lifelog data items themselves are not displayed in this screen.

Each of test items 611 and 621 are one or more test items selected by the user from among the test items included in the workflow data, and are an example of associative data items. The user inputs result values 614 and 624 of the respective test items, for example, by asking the patient, for whom each of the unlabeled transfer target data items is obtained, to perform actions indicated by the test items 611 and 621 or by asking the patient about the test items 611 and 621.

In response to the input, one or more labeled transfer target data items each of which is assigned an associative data item that is the same or close to the value of the input result 614 of the test item are obtained, and a label group 615 including the labels of the one or more labeled transfer target date items is displayed. In addition, one or more labeled transfer target data items each of which is assigned an associative data item that is the same or close to the value of the input result 624 of the test item are obtained, and a label group 625 including the labels of the one or more labeled transfer target data items is displayed.

Label charts 613 and 623 display, in a chart format, the labels selected by the user from the label groups 615 and 625, respectively.

The user selects a label considered to be the closest to the correct attribute value that is common to the two unlabeled transfer target data items from the label groups 615 and 625 and then presses the OK button 607. In response to pressing of the OK button 607, labeled transfer target data items, which are the two unlabeled transfer target data items assigned the selected label, are stored in the labeled transfer target data storage unit 410.

In addition, in response to pressing of the relearn button 608, the weight W used in the neural network apparatus 100 is readjusted by using the labeled transfer target data items stored in the labeled transfer target data storage unit 410. At that time, the output layer adjusting unit 220 may remove the unrelated unit that has output the evaluation values deviating from the reference range for the two unlabeled transfer target data items before the weight W is readjusted.

Such a configuration allow the user to interactively specify the correct label while viewing the unlabeled transfer target data items or the associative data items of the unlabeled transfer target data items which are presented when deficiency in learning is detected. In addition, the weight values can also be readjusted through additional learning by using the label, and an unrelated item that may possibly cause incorrect feature extraction may be removed one by one.

Although the transfer learning apparatuses according to the embodiments of the present disclosure have been described above, the present disclosure is not limited to these embodiments.

Figure 25:
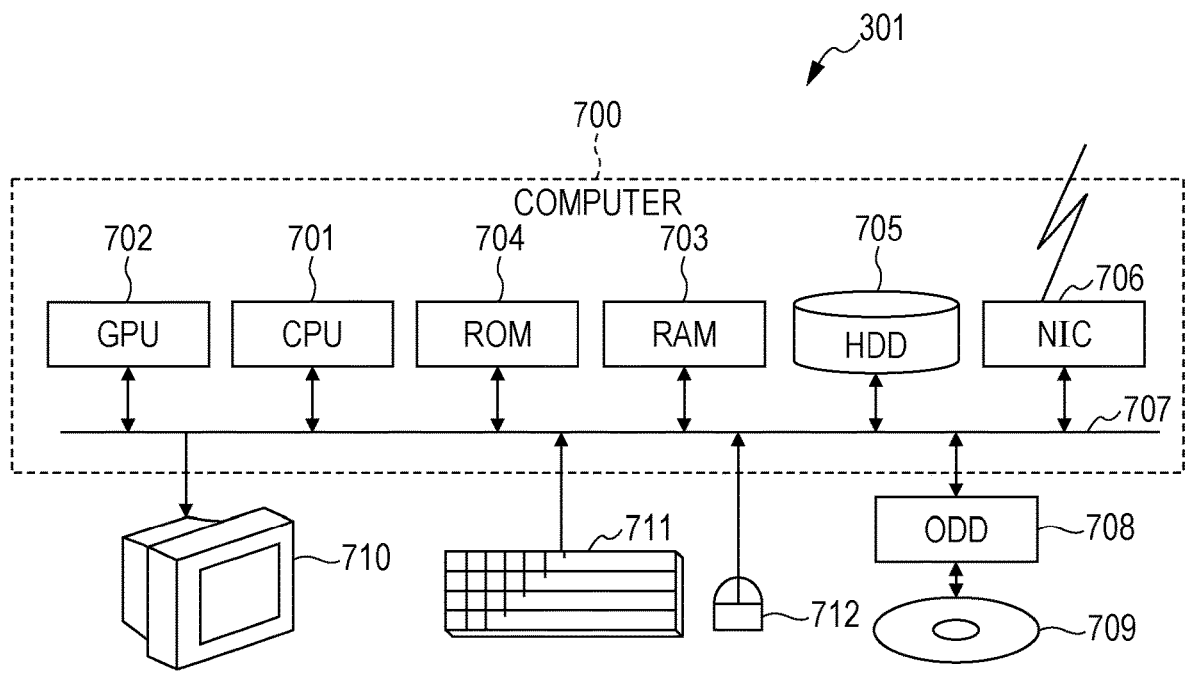
FIG. 25 is a block diagram illustrating an example of a hardware configuration for implementing a transfer learning system.

For example, the transfer learning system 301 may be implemented by using a computer. FIG. 25 is a block diagram illustrating an example of a hardware configuration for implementing the transfer learning system 301.

The transfer learning system 301 includes a computer 700, a keyboard 711 and a mouse 712 used to input an instruction to the computer 700, a display 710 used to present information, such as a computation result obtained by the computer 700, and an optical disc drive (ODD) 708 for reading a program executed by the computer 700.

The program executed by the transfer learning system 301 is stored on a computer-readable optical storage medium 709 and is read by the ODD 708, Alternatively, the program is read by a network interface controller (NIC) 706 via a computer network.

The computer 700 includes a central processing unit (CPU) 701, a read-only memory (ROM) 704, a random access memory (RAM) 703, a hard disk drive (HDD) 705, the NIC 706, and a bus 707.

The computer 700 may further include a graphics processing unit (CPU) 702 in order to perform high-speed computation.

The CPU 701 and the CPU 702 execute a program that is read by the ODD 708 or the NIC 706. The ROM 704 stores a program and data that are necessary for the computer 700 to operate. The RAM 703 stores data, such as parameters used during execution of the program. The HDD 705 stores programs and data, for example. The NIC 706 communicates with another computer via a computer network. The bus 707 connects the CPU 701, the ROM 704, the RAM 703, the HDD 705, the NIC 706, the display 710, the keyboard 711, the mouse 712, and the ODD 708 to one another. The keyboard 711 and the mouse 712, and the ODD 708 connected to the computer 700 may be omitted, for example, in the case where the display 710 includes a touchscreen and in the case where the NIC 706 is used, respectively.

Further, some or all of constituents of the transfer learning system 301, the constituents corresponding to the above-described apparatuses, may be implemented by a single system large scale integration (LSI). A system LSI is a super-multifunctional LSI in which a plurality of constituent units are integrated on a single chip. Specifically, a system LSI is a computer system including a microprocessor, a ROM, and a RAM. The RAM stores a computer program. The microprocessor operates in accordance with the computer program, whereby the system LSI implements the functions.

Alternatively, some of or all of the constituents corresponding to the above-described apparatuses may be implemented by an integrated circuit (IC) card or a unit module detachably attached to each of the apparatuses. The IC card or unit module is a computer system including a microprocessor, a ROM, and a RAM. The IC card or unit module may include the super-multifunctional LSI described above. The microprocessor operates in accordance with a computer program, whereby the IC card or unit module implements the functions. The IC card or unit module may be tamper-resistant.

Further, the embodiments of the present disclosure may be configured as methods described above. In addition, the present disclosure may encompass a computer program that implements these methods by using a computer and a digital signal based on the computer program.

Furthermore, the present disclosure may encompass non-transitory computer-readable storage media storing thereon the computer program or the digital signal, for example, a flexible disk, a hard disk, a CD-ROM, a magneto-optical (MO) disk, a digital versatile disc (DVD), a DVD-ROM, a DVD-RAM, a Blu-ray (registered trademark) Disc (BD), and a semiconductor memory. In addition, the present disclosure may encompass the digital signal stored on these non-transitory computer-readable storage media.

Moreover, the present disclosure may encompass a configuration in which the computer program or the digital signal is transmitted via an electric communication line, a wireless or wired communication circuit, a network such as the Internet, data broadcasting, or the like.

Further, the present disclosure may be implemented by an independent computer system by transporting the non-transitory storage medium after storing the computer program or the digital signal thereon or by transmitting the computer program or the digital signal via the network.

Figure 26:
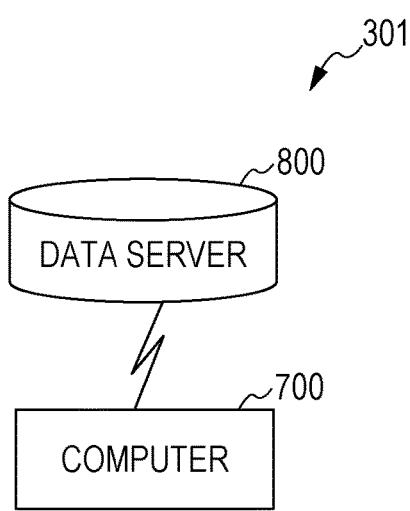
FIG. 26 is a schematic diagram illustrating an example of the transfer learning system that uses a data server.

In addition, the present disclosure may be implemented in the following manner. As illustrated in FIG. 26, a data server 800 is prepared separately from the computer 700. Data to be stored on a memory or the like may be stored in the data server 800, and the computer 700 may read information of the data via the network or the like. The number of computers 700 used to read the information from the data server 800 is not necessarily one and may be plural. In such a case, each of the computers 700 may implement at least one of the constituents of the transfer learning system 301.

Further, each of the embodiments described above and each of the modifications described above may be combined.

The embodiments disclosed herein are exemplary in all aspects and should be considered to be non-limiting. The scope of the present disclosure is indicated not by the above description but by the scope of the claims and is intended to encompass all modifications within the meaning and the scope equivalent to the scope of the claims.

According to the embodiments of the present disclosure, data learning can be performed without being affected by negative transfer caused by overfitting and data combination. Accordingly, the embodiments of the present disclosure are applicable to a data learning apparatus that recognizes and classifies images or sensor values.

What is claimed is:

1. A transfer learning method comprising:

determining a plurality of weight values for a plurality of neurons in a neural network using a plurality of first datasets, each of the plurality of first datasets including a non-medical image;

performing a first process using each of a plurality of second datasets, each of the plurality of second datasets including (i) a set of pixel values of a medical image including a lesion image and (ii) a label value indicating the medical image includes the lesion image, the first process being performed n times while incrementing k from 1 to n, where n denotes a total number of the plurality of second datasets and k denotes a natural number, the first process being performed using a k-th second dataset from among the plurality of second datasets by inputting the set of pixel values of the medical image included in the k-th second dataset to the neural network, obtaining a first evaluation value output from each of a plurality of output layer neurons of the neural network in response to the inputted set of pixel values of the medical image included in the k-th second dataset, and determining which output layer neuron from among the plurality of output layer neurons outputs the first evaluation value closest to the label value included in the k-th second dataset;

after performing the first process n times, determining a first appearance value for each of the plurality of output layer neurons, the first appearance value indicating a frequency of appearance of the output layer neuron outputting the first evaluation value closest to the label value in the k-th second dataset;

performing a second process using each of a plurality of third datasets, each of the plurality of third datasets including (i) a set of pixel values of a medical image not including a lesion image and (ii) a label value indicating the medical image does not include the lesion image, the second process being performed m times while incrementing j from 1 to m, where m denotes a total number of the plurality of third datasets and j denotes a natural number, the first process being performed using a j-th third dataset from among the plurality of third datasets by inputting the set of pixel values of the medical image included in the j-th third dataset to the neural network, obtaining a second evaluation value output from each of a plurality of output layer neurons of the neural network in response to the inputted set of pixel values of the medical image included in the j-th third dataset, and determining which output layer neuron from among the plurality of output layer neurons outputs the second evaluation value closest to the label value included in the j-th second dataset;

after performing the second process m times, determining a second appearance value for each of the plurality of output layer neurons, the second appearance value indicating a frequency of appearance of the output layer neuron outputting the second evaluation value closest to the label value in the j-th third dataset;

determining a first output layer neuron from among the plurality of output layer neurons using both of (i) the first appearance value determined for each of the plurality of output layer neurons and (ii) the second appearance value determined for each of the plurality of output layer neurons;

determining a second output layer neuron from among the plurality of output layer neurons using both of (i) the first appearance value determined for each of the plurality of output layer neurons and (ii) the second appearance value determined for each of the plurality of output layer neurons, the second output layer neuron being different from the first output layer neuron; and after determining the first output layer neuron and the second output layer neuron, (i) inputting pixel values of an unlabeled target medical image to the neural network and (ii) determining whether or not the unlabeled target medical image includes a lesion image based on (a) an evaluation value output from the first output layer neuron in response the inputted pixel values of the unlabeled target medical image and (b) an evaluation value output from the second output layer neuron in response to the inputted pixel values of the unlabeled target medical image, wherein a total number of the plurality of first datasets is larger than (n+m).

2. The transfer learning method of claim 1, wherein for each of the plurality of output layer neurons, the first appearance value is determined by ratio of (i) the number of times the first evaluation value output by the output layer neuron is closest to the label value in the k-th second dataset to (ii) the total number of the plurality of second datasets, and wherein for each of the plurality of output layer neurons, the second appearance value is determined by ratio of (i) the number of times the second evaluation value output by the output layer neuron is closest to the label value in the j-th third dataset to (ii) the total number of the plurality of third datasets.

* * * * *